(12) United States Patent
Aguilar et al.

(10) Patent No.: US 9,809,308 B2
(45) Date of Patent: Nov. 7, 2017

(54) LOAD TRANSPORT AND RESTRAINING DEVICES AND METHODS FOR RESTRAINING LOADS

(71) Applicant: General Electric Company, Schenectady, NY (US)

(72) Inventors: Artemio Josue Aguilar, Querétaro (MX); Juan Carlos Oidor, Querétaro (MX); Mario Oscar Ramirez, Querétaro (MX)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/875,969

(22) Filed: Oct. 6, 2015

(65) Prior Publication Data

US 2017/0096093 A1  Apr. 6, 2017

(51) Int. Cl.
  *B60P 7/08* (2006.01)
  *B61D 45/00* (2006.01)
  (Continued)

(52) U.S. Cl.
  CPC ........... *B64D 9/003* (2013.01); *B61D 45/001* (2013.01); *B61C 3/00* (2013.01); *B61D 3/16* (2013.01)

(58) Field of Classification Search
  CPC .. B61C 3/00; B61D 3/16; B61D 3/166; B61D 3/182; B61D 3/185; B61D 45/001; B61F 9/00; B61F 13/00; B64D 9/0003
  (Continued)

(56) References Cited

U.S. PATENT DOCUMENTS 1,087,773 A * 2/1914 Johnson .................... B61F 9/00
                                                              104/246
3,809,266 A   5/1974 Salerni
                        (Continued)

FOREIGN PATENT DOCUMENTS

DE       3810578 A1 * 7/1989   ............... B61B 9/00
EP       0521834 B1 * 6/1995   ............. B61D 3/188

OTHER PUBLICATIONS

"Railway Applications Wheelsets and Bogies", European Committee for Standardization, Jan. 2009, 51 Pages.
(Continued)

*Primary Examiner* — Charles A Fox
*Assistant Examiner* — Joseph J. Sadlon
(74) *Attorney, Agent, or Firm* — Ernest G. Cusick; Hoffman Warnick LLC

(57) ABSTRACT

Load transport and retraining devices and methods for restraining industrial machines or heavy machinery, such as, turbines, to prevent displacement during adverse environmental conditions, such as, pitching and rolling seas, are provided. The devices include support structures adapted to support loads and having wheels positioned and adapted to engage rails. The wheels include a first set of wheels adapted to ride on top of the rails and a second set of wheels adapted to engage the sides of the rails and thereby retain the support structure to the rails. The devices may also include a third set of wheels adapted to also engage the sides of the rails. The devices may include brake and drive assemblies to facilitate handling. Aspects of the disclosure are uniquely adapted to turbines, but other aspects of the disclosure may restrain any industrial machine that may be exposed to adverse environmental conditions.

18 Claims, 12 Drawing Sheets

(51) Int. Cl.
  *B64D 9/00*  (2006.01)
  *B60P 3/00*  (2006.01)
  *B61D 3/16*  (2006.01)
  *B61C 3/00*  (2006.01)

(58) Field of Classification Search
  USPC .................. 414/800; 104/243, 245, 246, 247
  See application file for complete search history.

(56) References Cited

U.S. PATENT DOCUMENTS

| | | | |
|---|---|---|---|
| 3,958,516 A * | 5/1976 | Cheung | B60P 7/0815 |
| | | | 410/115 |
| 4,270,459 A | 6/1981 | Schwarzkopf | |
| 5,074,678 A | 12/1991 | Eberle | |
| 5,595,121 A | 1/1997 | Elliott et al. | |
| 6,113,273 A | 9/2000 | Eberle et al. | |
| 6,152,043 A * | 11/2000 | Haring | B61F 9/00 |
| | | | 104/140 |
| 6,269,750 B1 | 8/2001 | Cornwell et al. | |
| 6,279,309 B1 * | 8/2001 | Lawlor | F02K 7/10 |
| | | | 60/39.35 |
| 6,397,756 B1 | 6/2002 | Saiko et al. | |
| 6,499,588 B1 | 12/2002 | Eberle | |
| 6,595,140 B1 * | 7/2003 | Madison | E01B 29/32 |
| | | | 104/16 |
| 6,619,432 B1 | 9/2003 | Yasui | |
| 6,679,182 B2 | 1/2004 | Spieldiener et al. | |
| 7,090,456 B2 | 8/2006 | Ost et al. | |
| 7,104,692 B1 | 9/2006 | Lu | |
| 7,306,415 B2 * | 12/2007 | Halliar | B60P 7/135 |
| | | | 410/77 |
| 7,353,758 B2 | 4/2008 | Murray | |
| 8,117,968 B2 | 2/2012 | Rose et al. | |
| 9,738,402 B2 * | 8/2017 | Brown | B64F 5/60 |

OTHER PUBLICATIONS

Madler et al., "Materials Used for Wheels on Rolling Stock", Deutsche Bahn AG, Technical Centre, Brandenburg-Kirchmoser, 8 Pages.
"Rail Technical Guide", Tata Steel, 2014, 24 Pages.
"LM2500 Marine Gas Turbine", GE Marine, 2014, 2 Pages.
"LM6000 Marine Gas Turbine", GE Marine, 2014, 2 Pages.

* cited by examiner

LOAD TRANSPORT AND RESTRAINING DEVICES AND METHODS FOR RESTRAINING LOADS

BACKGROUND OF THE INVENTION

Technical Field

Embodiments of the present disclosure generally relate to the transport and restraining of loads, for example, heavy machinery or equipment, especially during severe, adverse environmental conditions. More particularly, embodiments of the present disclosure relate to methods and devices for restraining turbines, or other loads, equipment, or industrial machines, during transport, servicing, and use during severe, adverse environmental conditions, such as, rolling seas.

Description of Related Art

A variety of industrial and commercial applications may use heavy machinery, such as, generators and turbomachinery (for example, turbines, compressors, and pump). The heavy machinery may be moved and transported for many reasons, such as, for initial installation, for servicing, or for replacement. Unfortunately, the heavy machinery may be installed in locations that may be movable or unstable. For example, the heavy machinery may be installed on ships or trucks. Heavy machinery also may be difficult to move and transport due to variations in weight, size, shape, center of gravity, or other characteristics of the machinery. As a result, the heavy machinery may be difficult to move and transport.

Large heavy machinery, such as, generators and turbomachinery (for example, turbines, compressors, and pumps), such as, a gas turbine, is often transported by land, sea, and air to, for example, desired installation sites. During transport, the transport vehicle and the heavy machinery may be exposed to adverse environmental conditions or even severe adverse conditions, for example, inclement seas, turbulent air, or rough roads, that can expose the transport vehicle and its contents to destabilizing forces that can cause the equipment to shift or topple during transport. This undesirable dislocation of the heavy machinery can damage the equipment or damage the transport vehicle (that is, the plane, ship, train, or truck).

For example, in the handling and transport of loads, such as, turbines (or any other equipment, industrial machine, or heavy machinery), for example, gas turbines, the turbines may typically be mounted on transportation devices (also know as "dollies") to transport the turbines, for example, aboard a ship. These transport devices typically include support structures mounted on wheels, for example, rubber wheels, that facilitate handling, but are not ideal for restraining the device and the turbine during adverse environmental conditions, such as, the rolling and pitching of the deck of a transport ship. The dolly may only be restrained by friction between the wheels and, for example, the deck upon which the wheels rest, and inclement seas can cause rolling, shifting, or toppling of the dolly and its contents.

Aspects of the present disclosure provide improvements to the art of transporting heavy machinery.

SUMMARY OF THE INVENTION

According to aspects of the disclosure, a load transport and restraining device and methods for restraining a load are provided. Some aspects of the disclosure are uniquely adapted to the transporting and restraining loads like turbines, such as, gas turbines, but other aspects of the disclosure may be effective for transporting any load requiring restraint during transport, especially under severe, adverse environmental conditions.

One embodiment of the disclosure is a load transport and restraining device comprising or including: a support structure adapted to receive a load; a first plurality of wheels mounted to the support structure, at least one of the first plurality of wheels positioned to contact a top of a first rail of a set of rails; and a second plurality of wheels mounted to the support structure, at least one of the second plurality of wheels positioned to contact a first side of the first rail of the set of rails; wherein contact of the least one of the first plurality of wheels with the top of the first rail and contact of the least one of the second plurality of wheels with the first side of the first rail substantially prevents disengagement of the support structure from the set of rails.

In one aspect, the load transport and restraining device may further comprise a third plurality of wheels mounted to the support structure, at least one of the third plurality of wheels is positioned to contact a second side, opposite the first side, of the first rail.

In another aspect, the device may further comprise an adjustable support for at least one of the second plurality of wheels. The adjustable support for the second plurality of wheels may be rotatably mounted to the support structure, wherein the rotatable supportable may engage and disengage the second plurality of wheels with the rails.

In another aspect, the device may further comprise an adjustable support for at least one of the third plurality of wheels. Again, the adjustable support for the third plurality of wheels may be rotatably mounted to the support structure, wherein the rotatable supportable may engage and disengage the third plurality of wheels with the rails.

In one aspect, the first plurality of wheels may be rotatably mounted to the support structure. In another aspect, the transport and restraining device may further include at least one transverse translation wheel assembly mounted to the support structure, for example, upon which the device may be translated in a direction different from the direction of the first rail. In another aspect, the transport and restraining device may further include a load elevation adjustment mechanism. In a further aspect, the transport and restraining device may include an arrangement for translating the device along a set of rails.

In another aspect, the device may include at least one brake assembly adapted to regulate rotation of at least one of the first plurality of wheels and/or at least one drive assembly adapted to rotate at least one of the first plurality of wheels.

Another embodiment of the disclosure is a method of restraining a load, such as, a turbine. The method comprises or includes: a) mounting a transport and restraining device comprising a support structure and a first plurality of wheels mounted to the support structure and a second plurality of wheels mounted to the support structure to a set of rails mounted on a surface wherein at least one of the first plurality of wheels contact a top of a first rail of the set of rails; b) prior to or after a), mounting a load to the transport and restraining device; and c) contacting at least one of the second plurality of wheels with a first side of the first rail; wherein the contact of the at least one of the first plurality of wheels with the top of the first rail and contacting at least one of the second plurality of wheels with the first side of the first rail at least partially restrains the load to the set of rails and the surface.

In one aspect, the transport and restraining device may include a rotatably mounted support structure for the at least one of the second plurality of wheels, and contacting at least one of the second plurality of wheels with the first side of the first rail may be practiced by rotating the rotatably mounted support structure wherein at least one of the second plurality of wheels contacts the first side of the first rail.

In another aspect, the transport and restraining device may include a third plurality of wheels mounted to the support structure, and the method may further include, before or after c), e) contacting at least one of the third plurality of wheels with a second side, opposite the first side, of the first rail.

The method may also include, prior to a) and b), d) transporting the load by rolling of the first plurality of wheels along the set of rails. For example, the transport and restraining device may include a brake assembly or a drive assembly each operatively connected to at least one of the first plurality of wheels, and d) transporting the load by rolling of the first plurality of wheels along the set of rails may be practiced by activating the brake assembly and/or the drive assembly.

Among other things, aspects of the disclosure can minimize or eliminate the risk of damage to the load itself, or to adjacent equipment, or to the transport vehicle (for example, the transport ship) can be minimized or prevented by aspects of the disclosure.

These and other aspects, features, and advantages of aspects of this disclosure will become apparent from the following detailed description of the various aspects of the disclosure taken in conjunction with the accompanying drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of aspects of the disclosure will be readily understood from the following detailed description of aspects of the disclosure taken in conjunction with the accompanying drawings in which:

DETAILED DESCRIPTION OF THE INVENTION

Certain embodiments commensurate in scope with the claimed disclosure are summarized below. These embodiments are not intended to limit the scope of the claimed disclosure, but rather these embodiments are intended only to provide a brief summary of possible forms of the disclosure. Indeed, the disclosure may encompass a variety of forms that may be similar to or different from the embodiments set forth below.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The disclosed embodiments are directed toward load transporting systems that facilitate movement of a load (for example, heavy machinery) while stabilizing the load. For example, the load may include turbomachinery (for example, a turbine, a compressor, or a pump), a generator, or a reciprocating internal combustion engine. As discussed in detail below, embodiments of the load transporting systems may enable movement of loads, for example, horizontal movement, while loads are mounted to a mounting surface, or cradle, of an aspect of the disclosure. In addition, in some aspects, the mounting surfaces of aspects of the disclosure may move relative to a primary or supporting surface (for example, the bed of a truck or deck of a ship). Accordingly, aspects of the disclosure can provide stability to the load and, for example, may ensure protection of the load and the surrounding structures.

Figure 1:
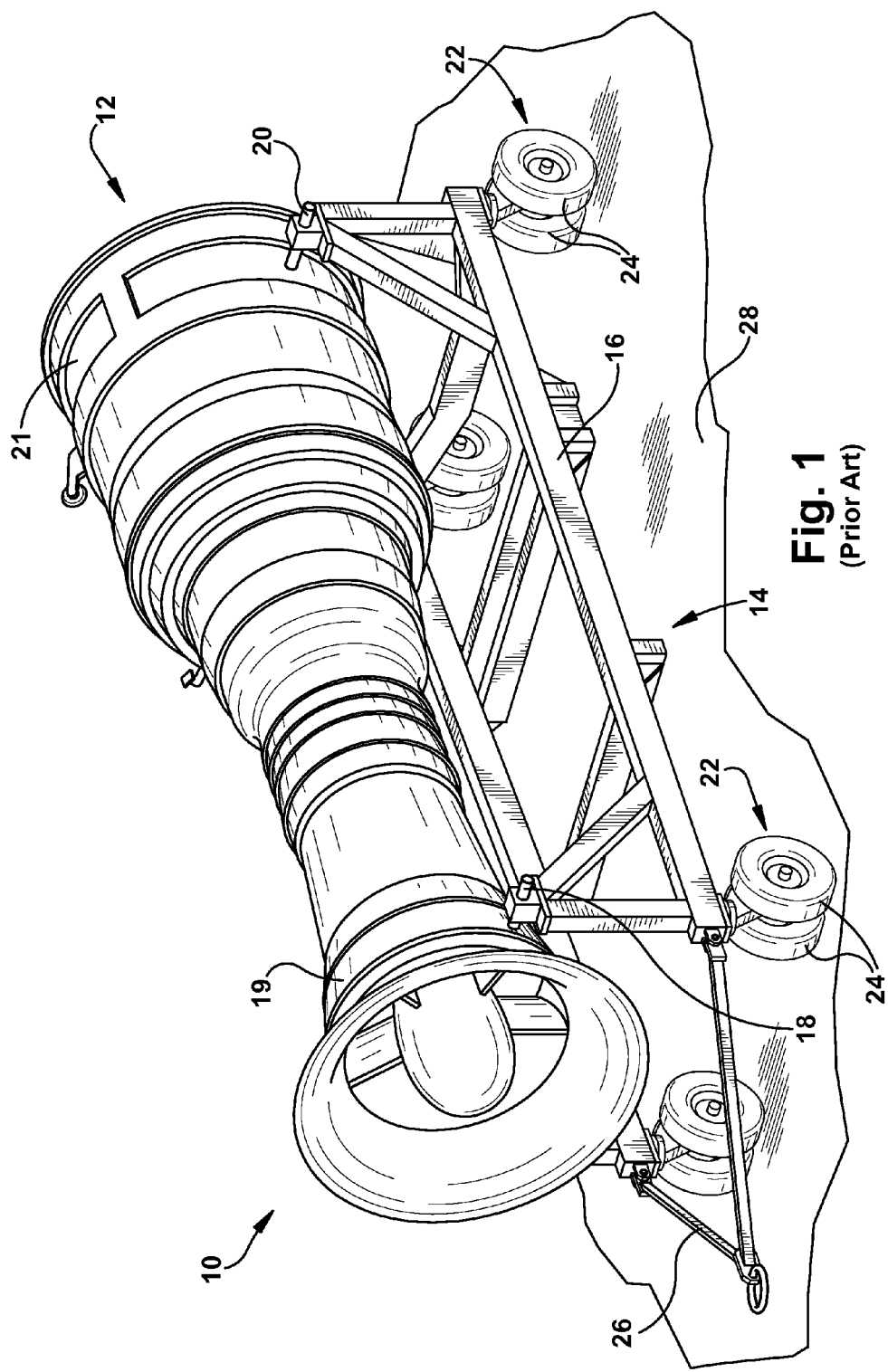
FIG. 1 is a perspective view of an arrangement of a load mounted on a transport and restraining device according to the prior art over which the present disclosure is an improvement.

FIG. 1 is a perspective view of an arrangement 10 of a load 12, for example, a piece of heavy machinery, such as, a turbine, mounted on a transport device 14 according to the prior art over which aspects of the present disclosure are improvements. As shown in FIG. 1, load 12, such as, a piece of industrial equipment, may typically comprise an elongated circular cylindrical assembly as known in the art, such as, a turbine, for example, a GE LM2500 gas turbine, a GE LM6000 gas turbine, or a GE LMS100 gas turbine, and the like. According to existing practice, when load 12 is prepared for and then transported, for example, by truck, plane, rail, or ship, load 12 is mounted to transport device, or "dolly," 14. Transport device 14 typically includes a support structure 16 having a set of spaced supports 18 and 20 sized and positioned to receive collars or "mounting aids" 19 and 21, respectively, which may typically be provided with load 12, and wheels 22. Mounting aids 19 and 21 may typically engage spaced supports 18 and 20 via "quick release pins," as known in the art, to facilitate installation, handling, servicing, and maintenance. Wheels 22 are typically conventional, having elastomeric, for example, "rubber," tires 24 positioned to the support structure 16 and roll along surface 28, for example, the bed of a truck or the deck of a ship. Transport device 14 may include a tow bar 26 by which transport device 14 may be moved along surface 28, for example, manually or by means of a vehicle.

Though the prior art transport device 14 shown in FIG. 1 has proven to be an effective means of transporting a load 12, such as, a heavy equipment, like a turbine or other industrial equipment, under certain conditions transport device 14 is less than ideal. For instance, during the transport of load 12 on transport device 14 under adverse conditions, for example, during rough wave conditions (for example, high pitching and rolling) during maritime transport or during rapid acceleration or deceleration during air or truck transport, transport device 14 may be insufficient in preventing undesirable movement of arrangement 10. Specifically, prior art arrangement 10 may only be restrained from movement due to friction between wheels 22 and surface 28. Though the use of rubber tires 24 can enhance the friction between wheels 22 and surface 28, and wheels 22 may be prevented from rolling by wheel locking devices, adverse conditions can prevail where the lateral loads can overcome the restraining force of friction where arrangement 10 may move from its desired or predetermined position. One embodiment of the present disclosure that addresses this inadequacy of the prior art shown in FIG. 1 is shown in FIG. 2.

Figure 2:
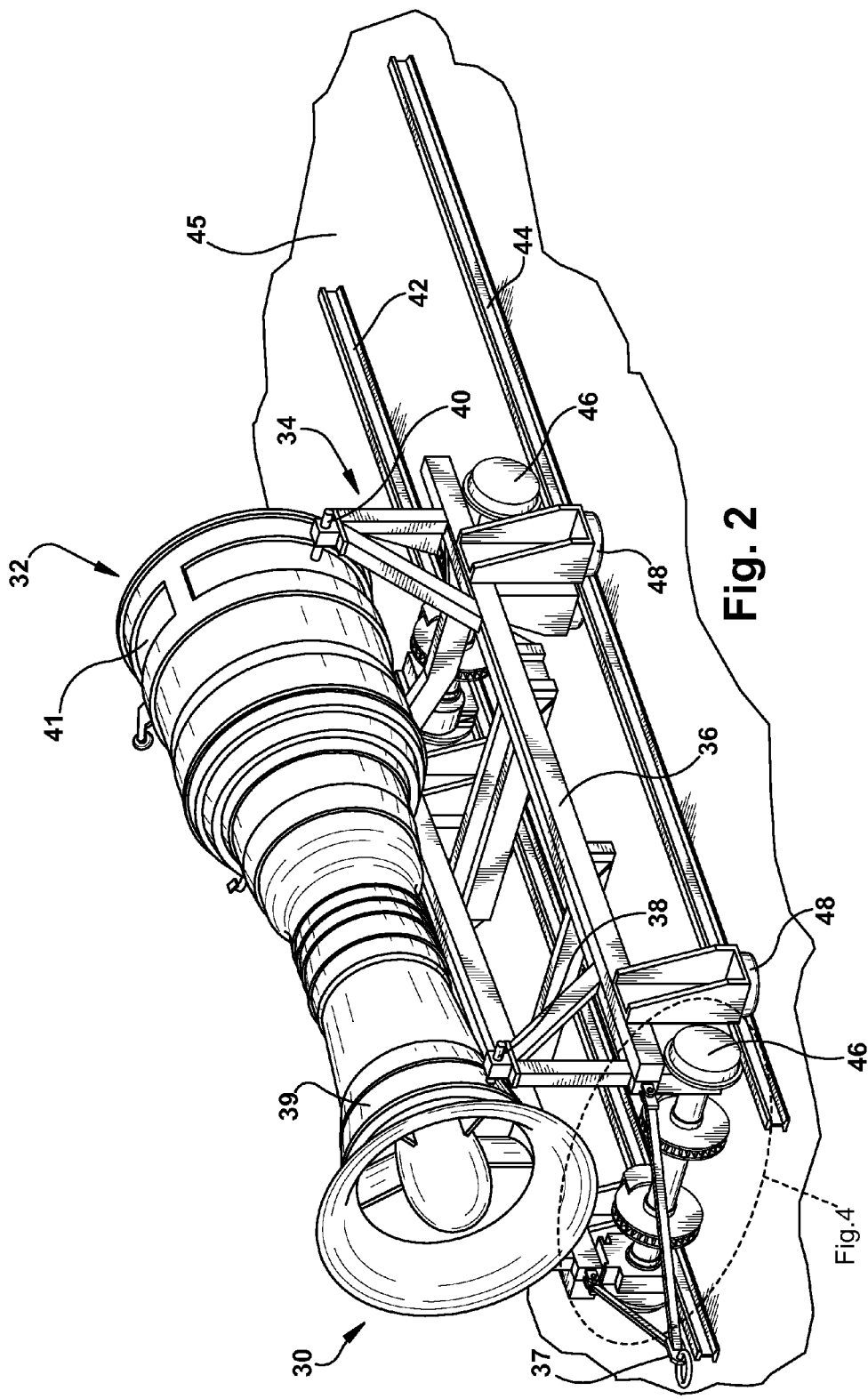
FIG. 2 is a perspective view of an arrangement of a load mounted on a transport and restraining device according to one aspect of the disclosure.

FIG. 2 is a perspective view of an arrangement 30 of a load 32, for example, a piece of heavy equipment, such as, a turbine, mounted on a transport and restraining device 34 according to one aspect of the present disclosure. In a fashion similar to the prior art, load 32 may typically comprise an elongated circular cylindrical assembly, as known in the art, for example, a GE LM2500 gas turbine, a GE LM6000 gas turbine, or a GE LMS100 gas turbine, and the like. Transport and restraining device, or "dolly," 34 typically includes a support structure 36 having a set of spaced structures 38 and 40 sized and positioned to receive mountings 39 and 41 which may be provided on load 32. According to this aspect of the disclosure, arrangement 30 also includes a set of rails or tracks 42, 44, for example, a set of elongated rails or tracks, for instance, rails similar to railroad rails. In the following disclosure of aspects of the disclosure, the expression "rails" will be used to refer to the elongated structures engaged by aspects of the disclosure. However, it is to be understood that aspects of the disclosure are not limited to "rails" per se, but it is envisioned that aspects of the disclosure may be used with or engage any structures, such as, tracks, channels, beams, pipes, bars, shafts, rods, tubes, structural conduit, supports, and the like, to provide aspects of the disclosure.

Rails 42, 44 may be rigidly mounted to surface 45, for example, a bed of a truck or plane, or the deck of a ship. In one aspect, rails 42, 44 may be removable from surface 45, for example, when not needed. According to this aspect of the disclosure, support structure 36 is adapted to engage rails 42 and 44 to minimize or prevent the movement of support structure 36 (and load 32) during adverse transport and/or storage conditions and/or during use. Transport and restraining device 34 may include a tow bar assembly 37 by which transport and restraining device 34 may be moved along rails 42 and 44, for example, manually, by means of a vehicle, or, as will be discussed below, driven by one or more drive assemblies mounted on transport and restraining device 34.

Figure 3:
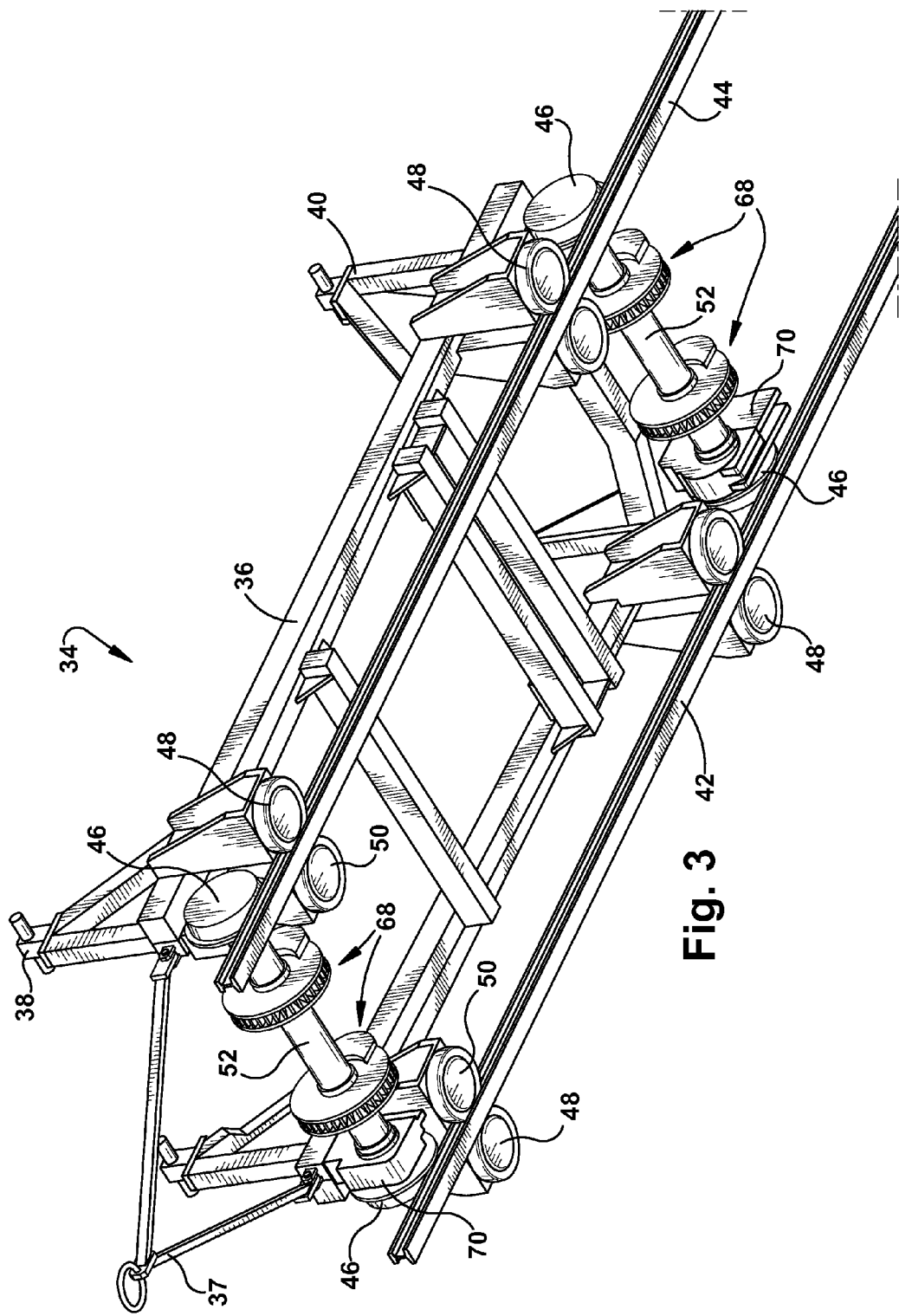
FIG. 3 is a bottom perspective view of the transport and restraining device shown in FIG. 2, where the load is omitted to better illustrate aspects of the disclosure.
Figure 4:
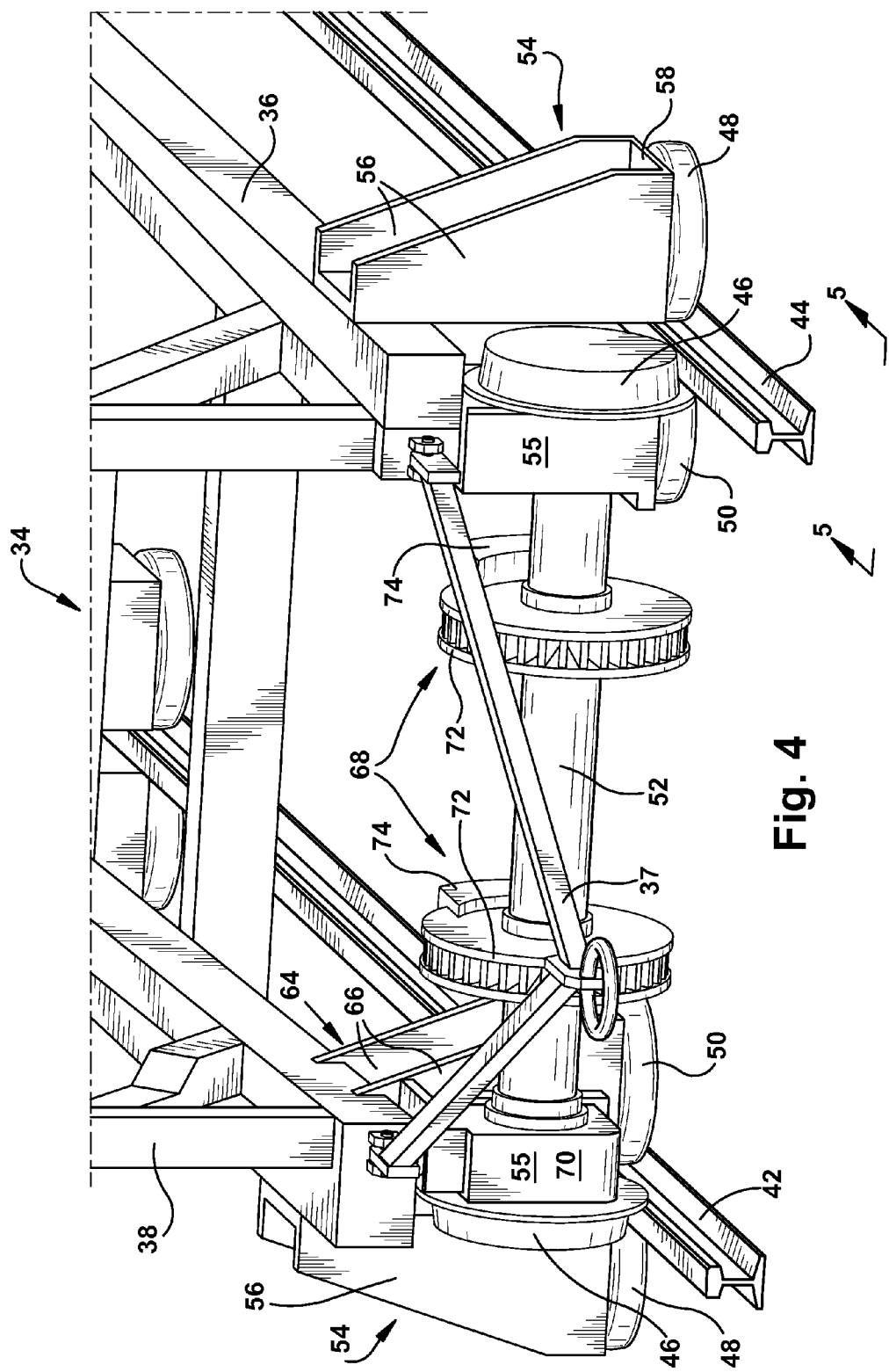
FIG. 4 is a detailed perspective view of aspects of the transport and restraining device shown in FIGS. 2 and 3 as identified by Detail 4 in FIG. 2.

FIG. 3 is a bottom perspective view of the transport and restraining device 34 shown in FIG. 2, where the load 32 and the surface 45 are omitted to better illustrate aspects of the disclosure. FIG. 4 is a detailed perspective view of aspects of the transport and restraining device 34 shown in FIGS. 2 and 3 as identified by Detail 4 in FIG. 2.

As shown in FIGS. 2, 3, and 4, according to one aspect, support structure 36 of transport and restraining device 34 includes appropriate structural members and may be secured to rails 42, 44 by means of a set of wheels 46 (for example, a first plurality of wheels) mounted to support structure 36, and at least one set of wheels 48 (for example, a second plurality of wheels) mounted to support structure 36. According to aspects of the disclosure, contact of at least one of the first plurality of wheels 46 with the top of rail 42 (for example, a first rail) and contact of at least one of the second plurality of wheels 48 with one of the sides (for example, a first side) of rail 42 substantially prevents disengagement of the support structure 36 (and hence the load 32) from the set of rails 42, 44 (which are secured to surface 45). Though in one aspect at least one of the first plurality of wheels 46 may contact rail 42 and at least one of second plurality of wheels 48 may contact rail 42, in other aspects, typically, two or more wheels 46, 48 may contact rails 42 and 44 (for example, a first and a second rail, respectively). For example, as shown in FIGS. 2 and 3, exactly four (4) wheels 46 and exactly four (4) wheels 48 may preferably contact both rails 42 and 44, respectively, to secure support structure 36 (and its contents) to rails 42, 44.

As also shown in FIGS. 2, 3, and 4, according to another aspect of the disclosure, wheels 50 (FIGS. 3 and 4)(for example, a third plurality of wheels) may be mounted to support structure 36, and at least one of the wheels 50, but typically two or more, may be positioned to contact a side (for example, a second side, opposite the first side) of the sides of rail 42 (for example, the first rail) to secure support structure 36 to rail 42. Furthermore, two or more wheels 50 may be mounted to support structure 36 and contact rails 42 and 44 to secure support structure 36 to rails 42 and 44. For example, as shown in FIGS. 3 and 4, exactly four (4) wheels 50 may preferably contact both rails 42 and 44, respectively, to further secure support structure 36 (and its contents) to rails 42, 44.

As shown most clearly in FIG. 4, wheels 46 may typically be mounted to an axle 52 rotatably mounted to support structure 36 of transport and restraining device 34. Axle 52 may be fixed or may rotate with wheels 46. In the aspect shown in FIG. 4, axle 52 rotates with wheels 46. For example, axle 52 may be mounted to support structure 36 by means of anti-friction bearings (not shown), for example, ball, roller, or journal bearings, positioned in bearing housings 55 mounted to support structure 36.

As also shown in FIG. 4, wheels 48 may be rotatably mounted to support structure 36. In the aspect shown in FIG. 4, wheels 48 may be mounted to support structure 36 by means of a wheel support structure 54. Wheel support structure 54 may include a pair of flanges 56 and a bottom plate 58 to which wheel 48 is rotatably mounted. As shown most clearly in FIG. 5, wheel 48 may be mounted to a pinion 60 mounted to plate 58 (shown in FIG. 4) and an antifriction bearing assembly 62, for example, a journal bearing or a roller bearing. Wheel 48 may be made from a metal, such as, steel, or a non-metallic material, for example, a plastic or an elastomer, such as, a rubber, whereby friction between wheel 48 and rails 42, 44 is enhanced. Wheel 48 may be made from a natural polymer, such as, polyisoprene rubber, or a synthetic polymer, such as, a neoprene, a thermoplastic elastomer, a thermoplastic rubber, and a polyvinyl chloride, or an ethylene propylene diene monomer (EPDM) rubber, and the like. In one preferred aspect, wheel 48 may be made of a rubber or rubber compound amenable to cold weather, for example, temperatures below 32 degrees F. Wheel 48 may also comprise a rubber or rubber compound having enhanced cut resistance and/or tear resistance.

Figure 5:
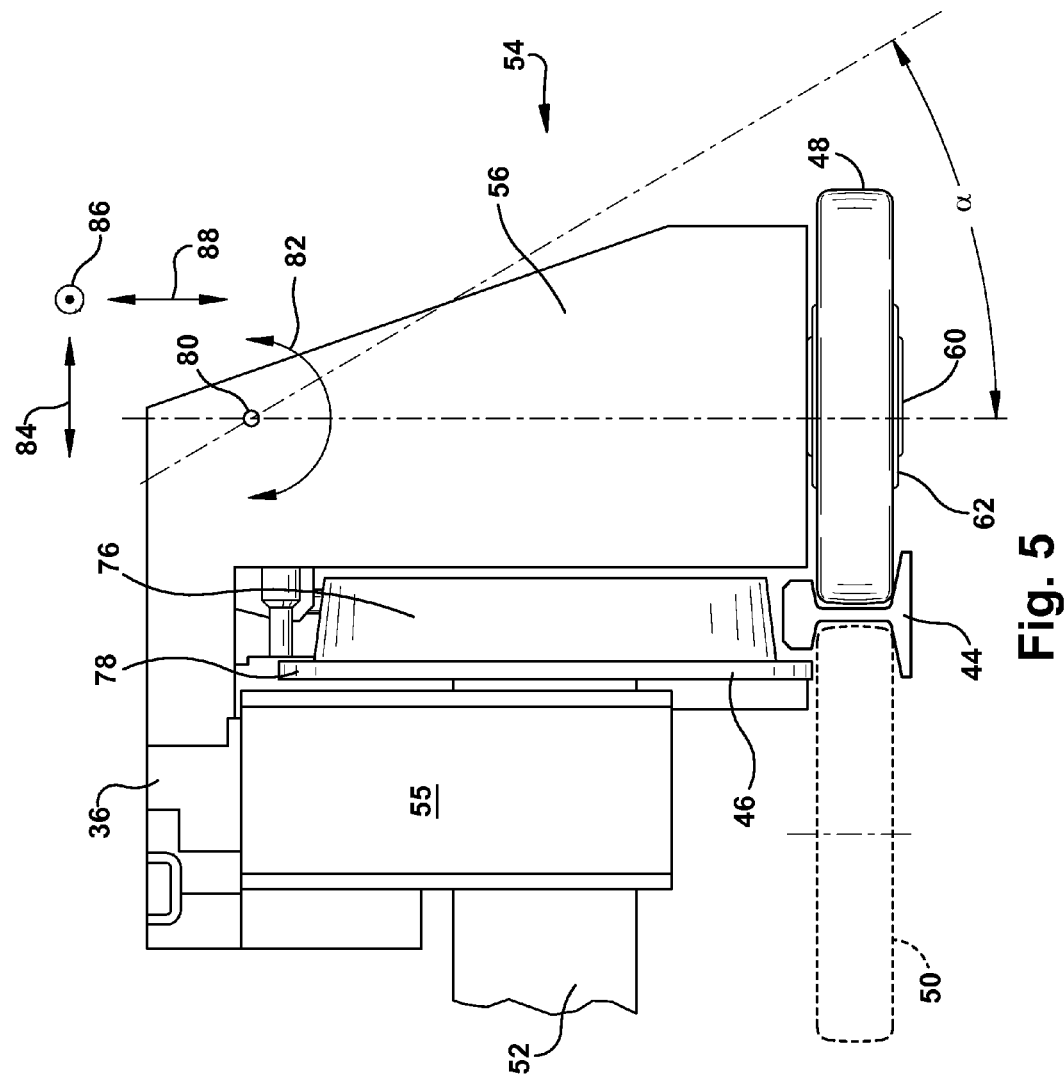
FIG. 5 is a front elevation view of aspects of the transport and restraining device shown in FIG. 4 as viewed along View Lines 5-5 in FIG. 4.

As shown in FIGS. 3 through 5, transport and restraining device 34 may also include wheels 50 rotatably mounted to support structure 36. In the aspect shown in FIG. 4, wheels 50—in a fashion similar to wheels 48—may be mounted to support structure 36 by means of a wheel support structure 64, having flanges 66 similar to flanges 54 and a bottom plate (not shown) similar to bottom plate 58. Wheels 50 may also be mounted to support structure 64 in a manner similar to wheels 48, for example, by means of a pinion (not shown) mounted to the bottom plate and an antifriction bearing (not shown). Wheels 50 may also comprise one of the same or similar materials as wheels 48, for example, a rubber or rubber compound amenable to cold weather.

As also shown in FIGS. 3 and 4, in one aspect, transport and restraining device 34 may include one or more brake assemblies 68 and/or one or more drive assemblies 70 associated with one or more axles 52. Though any type of brake assembly 68 may be used, for example, a drum brake, a disc brake, or an electromagnetic brake, in the aspect shown in FIG. 4, brake assemblies 68 may comprise disk brakes having rotors 72 mounted on shaft 52 and brake pad assemblies 74 mounted to support structure 36, for example, by conventional means, such as, by mechanical fasteners.

Drive assemblies 70 may be associated with one or more axles 52 of transport and restraining device 34. Drive assembly 70 may be any form of conventional source of rotational motive force, for example, an electric motor, a hydraulic motor, or a pneumatic motor, among others. Drive assembly 70 may drive axle 52 using a belt, a chain, or gears, among other drive train components.

FIG. 5 is a front elevation view of aspects of the transport and restraining device shown in FIG. 4 as viewed along view line 5-5 shown in FIG. 4. As shown in FIGS. 4 and 5, wheels 46 may comprise a circular cylindrical body 76 (FIG. 5) having an outside diameter sized to contact and rotate upon the top, or the "head," of rail 44 (or rail 42). Though body 76 of wheel 46 may be right circular cylindrical, as shown most clearly in FIG. 5, body 76 may be conical cylindrical, for example, having a taper on the outer surface bearing against rail 46. This taper may vary from 1 degree to 10 degrees, for example, a taper of 1 in 20 (that is, about 2.86 degrees), as is common in the art, and typically has the same taper of the surface of rail 44 (and rail 42) against which wheel 46 bears. Wheels 46 may also have a flange or lip 78 (FIG. 5), for example, a projection from the surface of body 76 positioned and sized to assist in the engagement and alignment of wheel 46 with rail 44 (and 42). Wheels 46 may be metallic or non-metallic, such as, a plastic; however, in one aspect, wheels 46 may typically be metallic. In one aspect, wheels 46 may be made from steel, stainless steel, iron, aluminum, or titanium, but are typically made from steel, for example, a steel adhering to European Railway Standard EN 13262 (incorporated by reference herein), for instance, a grade ER6, ER7, ER8, or ER9, or their equivalent. In one aspect, wheels 46 may comprise "train wheels" or "rail wheels."

Rails 42 and 44 may comprise any conventional rail cross-section, or "profile," for example, a "flat bottomed rail" or a "bullhead" rail, as known in the art. In one aspect of the disclosure, rails 42 and 44 may comprise I-beams, for example, where wheel 46 contacts and rotates upon the top flange of the I-beam and wheels 48 (and 50) contact and/or rotate upon the web of the I-beam. Like wheels 46, rails 42 may be metallic or non-metallic, such as a wood or a plastic, but are typically metallic. In one aspect, rails 42 and 44 may be made from steel, stainless steel, iron, aluminum, or titanium. However, in one aspect, rails 42 and 44 comprise "low weight" rails, for example, rails provided by Tata Steel of Scunthorpe, UK (Tata Steel "Rail Technical Guide" (2104) is incorporated by reference herein), for example, Tata Steel grade R200, or their equivalent. Rails 42 and 44 may be affixed to surface 45 (see FIG. 2) by conventional means, for example, by means of welding, mechanical fasteners, or an adhesive.

As most clearly shown in FIG. 5, according to aspects of the disclosure, the contact and/or engagement of wheels 46 and wheels 48 (and wheels 50) with rails 42 and 44 restrain the movement of support structure 36 and, accordingly, restrain the movement of transport and restraining device 34. For example, in one aspect, contact between wheels 46 and the top of rails 42 and 44 limits or prevents vertical movement of support structure 36, specifically, prevents downward movement of support structure 36 as depicted in FIG. 5. In addition, should wheels 46 include a flange 78, contact between flange 78 and the top of rails 42 and 44 limits or prevents lateral movement of support structure 36, specifically, prevents lateral movement of support structure 36 to the right as depicted in FIG. 5. Moreover, contact between wheels 48 and the web of rails 42 and 44 limits or prevents lateral movement of support structure 36, specifically, prevents lateral movement to the left of support structure 36 as depicted in FIG. 5. Further still, the restraining of support structure 36 by contact of wheel 46 with rails 42 and 44 and the restraining of support structure 36 by contact of wheel 48 with rails 42 and 44 can effectively provide a rotation-limiting moment (or twisting force) upon support structure 36 to minimize or prevent rotation (for example, toppling) of support structure 36 (and of transport and restraining device 34 and its load 32).

In addition, when a wheel 50 is present, the contact of wheel 50 with rail 44 (or 42) further limits or prevents lateral movement of support structure 36, specifically, further prevents lateral movement to the right of support structure 36 as depicted in FIG. 5. Moreover, the presence of wheel 50 may also further minimize or prevent rotation (for example, toppling) of support structure 36 (and transport and restraining device 34 and its load 32).

In the aspects of the disclosure shown in FIGS. 2 through 5, only single sets of wheels 46, 48, and 50 are shown, for example, at each end of transport and restraining device 34. However, according to aspects of the disclosure, one or more, or two or more, sets of wheels 46, 48, and 50 may be provided, for example, depending upon the size of the equipment, for example, the size of the load 32, being transported and restrained. For example, in one aspect, two or more wheels 46 rotatably mounted on two more axles 52 may be provided at each end of transport and restraining device 34, and/or two or more wheels 48 mounted on one or more pivotally mounted wheel support structures 54 may be provided at each end of transport and restraining device 34, and/or two or more wheels 50 mounted on one or more pivotally mounted wheel support structures 64 may be provided at each end of transport and restraining device 34. In addition, depending upon the size of the load 32 and the length of transport and restraining device 34, one or more sets of wheels 46, 48, and/or 50 may be provided at intermediate positions along the length of transport and restraining device 34, for example, between the locations of wheels 46, 48, and 50 shown in FIG. 2. The various numbers, locations, and configurations of wheels 46, 48, and/or 50 will be apparent to those of skill in the art.

The structures disclosed herein, for example, support structure 36 and wheel support structures 54 and 64 may typically be made of conventional materials of construction, for example, steel, stainless steel, aluminum, and titanium, among others. The structures may be fabricated from conventional framing members including beams, angles, rods, bars, and plates, and may be assembled using conventional means, for example, by welding, mechanical fasteners, and adhesives, and the like.

Though not shown, power and control wiring and cabling may be provided as needed, for example, mounted to support structure 36 where convenient. According to aspects of the disclosure, the power or control wiring or cabling may include quick connect/disconnect fittings, as known in the art, to facilitate installation, servicing, and maintenance.

In one aspect of the disclosure, wheel support structures 54 (and/or 64) may be pivotally mounted and/or translationally mounted to support structure 36. This aspect of the disclosure is most clearly illustrated in FIG. 5. According to one aspect, wheel support structure 54 (and/or 64) may be mounted to support structure 36 by means of a pivot or pin 80 whereby wheel support structure 54 (and/or 64) may be rotated as indicated by curved double arrow 82. The rotation of wheel support structure 54 (and wheel 48) may be practiced manually or automatedly, for example, by means of a mechanical (including pneumatic or hydraulic) or an electrical actuator. In one aspect, wheel support structure 54 (and/or 64) may be rotated through an angle α as shown in FIG. 5, for example, about an angle α relative to vertical ranging from about 1 degree to about 120 degrees, and all sub-ranges therebetween, for example, from engagement with rail 44 (and/or 42) to disengagement with rail 44 (and/or 42), but typically at least 15 degrees, for instance, between about 30 degrees and about 60 degrees, and all sub-ranges therebetween.

As also shown in FIG. 5, wheel support structures 54 (and/or 64) may be translationally mounted (or mounted for translation with respect) to support structure 36. As shown in FIG. 5, wheel support structures 54 (and/or 64) may be mounted to be translated horizontally, as indicated by double arrow 84 (for example, to the left or right as depicted in FIG. 5); and/or translated horizontally, as indicated by arrowhead 86 (for example, into and out of the page as depicted in FIG. 5); and/or translated vertically, as indicated by double arrow 88 (for example, up or down as depicted in FIG. 5). Any one or more of the translations of wheel support structure 54 (and wheel 48) may be practiced manually or automatedly, for example, by means of a mechanical (including pneumatic or hydraulic) or an electrical actuator.

The rotation and translation of wheel support structures 54 and/or 64 relative to support structure 36 of transport and restraining device 34 can assist in engaging and disengaging transport and restraining device 34 to and from rails 42 and 44. For example, as depicted in FIG. 5, the rotation of wheel support structure 54 about pin 80 through the angle α may disengage wheel 48 from rail 44 whereby wheel 48 and transport and restraining device 34 can be translated or moved along rail 44 (and 42) by rolling wheels 46 on rails 42 and 44, and/or removed from rail 44 (and 42). In one aspect, transport and restraining device 34 may be translated along rail 44 (and 42) by rolling wheels 46 and wheels 48 (and/or 50) on rail 44 (and 42). In a similar fashion, the horizontal translation of wheel support structure 54 as indicted by double arrow 84 may disengage wheel 48 from rail 44 (and 42) whereby transport and restraining device 34 can be rolled along rails 44 (and 42) on wheels 46 and/or removed from rail 44 (and 42). Horizontal translation of wheel support structure 54 as indicated by arrowhead 86 and/or double arrow 84 and vertical translation as indicted by double arrow 88 may also be effective in disengaging wheel 48 from rail 44 (and 42). Similarly, wheel 50 (shown in phantom in FIG. 5) and its respective support structure (not shown) may also be rotated and/or translated in a fashion similar to wheel 48 and wheel support structure 54.

According to further aspects of the disclosure, transport and restraining device 34 may translate along rails 42 and 44, for example, in a direction substantially parallel to the direction of elongation of rails 42 and 44. According to this aspect of the disclosure, transport and restraining device 34 can be used to move load 32, for example, when load 32 is a turbine or other piece of equipment, during or after installation of the turbine and/or during transport or servicing of the turbine. As evident throughout the foregoing disclosure, the rotation of wheels 46 and 48 (and/or 50) on or about rails 42 and 44 can facilitate translation of transport and restraining device 34 holding load 32 along rails 42 and 44. Moreover, according to aspects of the disclosure, the one or more brake assemblies 68 and/or the one or more drive assemblies 70 may be used to control the movement or translation of transport and restraining device 34 and load 32 along rails 42 and 44.

According to one aspect of the disclosure, the operation of moving or translating transport and restraining device 34 and/or the practice of engaging and disengaging transport and restraining device 34 to and from rails 42 and 44 may be practiced manually or automatedly. For example, in one aspect of the disclosure, wheels 48 (and 50) may be manually disengaged from rails 42 and 44, for example, by a technician appropriately trained and familiar with the operation of translating and/or rotating support structures 54 (and/or 64) into or out of engagement of wheels 48 (and 50) with rails 42 and 44, and then manually pushing (possibly with the help of others) transport and restraining device 34 along rails 42 and 44 to a desired location.

In another aspect, the operation of moving or translating transport and restraining device 34 may be handled automatedly, for example, with appropriate actuators, for instance, from an adjacent or a remote location. For example, in one aspect, the rotation and/or translation of wheel support structures 54 (and 64) with wheels 48 (and 50) may be controlled by electrical or mechanical actuators, for example, stepper motors, hydraulic or pneumatic pistons, and the like, operated under the control of an automated controller, for example, a computer or a programmable logic controller (PLC). The controller (not shown) may be located on or adjacent to transport and restraining device 34 (for example, contained in a hand-held device or a user interface mounted to transport and restraining device 34) that interfaces wirelessly or via wire to actuators mounted on transport and restraining device 34, for example, on or about support structure 36. In another aspect, the controller adapted to operate transport and restraining device 34 may be remotely located, for example, in an adjacent room or a distant location, that interfaces (for example, via a network and/or the internet) wirelessly or via wire to actuators mounted on transport and restraining device 34.

Similarly, brake assemblies 68 and drive assemblies 70 may be operated manually or automatedly. For example, in one aspect, the engagement of brake assembly 68 with shaft 52 may be practiced manually and the operation of drive assembly 70 may be practiced manually, for example, by a technician. However, in another aspect, the actuation of brake assembly 68 may be practiced automatedly and the operation of drive assembly 70 may be practiced automatedly, for example, controlled by electrical or mechanical actuators, for instance, stepper motors, hydraulic or pneumatic pistons, and the like, operated under the control of one or more automated controllers, for example, a computer or a programmable logic controller (PLC). The controllers (not shown) for brake assembly 68 and for drive assembly 70 may be located on or adjacent to transport and restraining device 34 (for example, contained in a hand-held device or a user interface mounted to transport and restraining device 34) that interfaces wirelessly or via wire to actuators mounted on transport and restraining device 34, for example, on or about support structure 36. In another aspect, the controllers adapted to operate brake assembly 68 and drive assembly 70 may be remotely located, for example, in an adjacent room or a distant location, which interfaces that, interfaces (for example, via a network and/or the internet) wirelessly or via wire to actuators mounted on transport and restraining device 34.

Accordingly, with the devices and systems described herein, it will be apparent to those of skill in the art that the operation of transport and restraining device 34 may be effected in a myriad of ways. However, the following discussion summarizes one mode of operation of aspects of the disclosure. For example, first, rails 42 and 44 comprising elongated rails of appropriate length (for example, at least 5 feet (1.5 meters [m]) in length, but typically 10 (3 m) to 50 feet (15 m) in length) are positioned and mounted to surface 45 (see FIG. 2), for example, to a deck of ship or a bed of a truck or plane. Rails 42 and 44 may be positioned and mounted by conventional means, for example, by mechanical fasteners.

Once rails 42 and 44 are positioned and secured, transport and restraining device 34 may be mounted to rails 42 and 44 whereby wheels 46 engage the tops of rails 42 and 44. At this time, load 32 may be mounted to transport and restraining device 34 (for example, using the mounting aids 39 and 41 described herein). Prior to transporting transport and restraining device 34 along rails 42 and 44, in one aspect, the operation or engagement of wheels 48 (and 50) and the operation of brake assembly 68 and drive assembly 70 may be tested and confirmed. Then, transport and restraining device 34 may be moved or translated along rails 42 and 44 manually (for example, by pushing or pulling) and/or by operation of drive assemblies 70 and/or brake assemblies 68, to a desired location.

Once the transport and restraining device 34 is in a desired location on rails 42 and 44, wheels 48 (and 50) may be engaged with rails 42 and 44 as described herein, for example, manually or automatedly rotated and/or translated into engagement, to secure transport and restraining device 34 and load 32 to surface 45. Again, in one aspect, surface 45 may be a pitching and rolling deck of a ship that can dislodge or topple a support structure 36 and load 32 that is not mounted using devices and methods according to aspects of the present disclosure.

Figure 6:
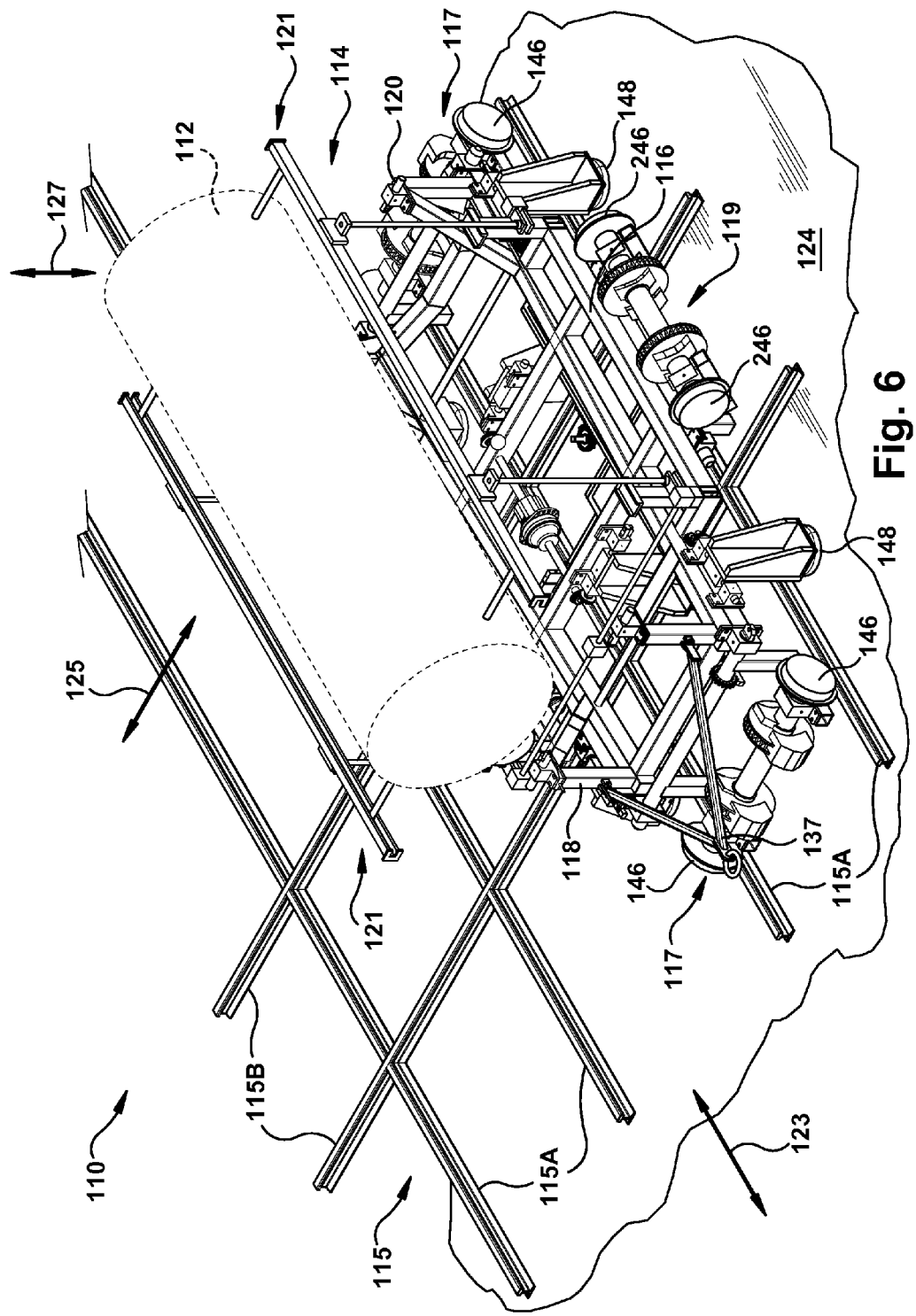
FIG. 6 is a perspective view of an arrangement of a load mounted on a transport and restraining device according to a further embodiment of the disclosure.

FIG. 6 is a perspective view of an arrangement 110 of a load 112, such as, a turbine, mounted on a transport and restraining device 114 according to a further embodiment of the disclosure. The load 112 may be a gas turbine, and the like, though other industrial machines, heavy machinery, or equipment may be handled by aspects of the disclosure. Transport and restraining device, or "dolly," 114 typically includes a frame or support structure 116 having a set of spaced structures 118 and 120 sized and positioned to receive load 112. Support structure 116 typically includes appropriate structural members to support load 112. In this aspect of the disclosure, transport and restraining device 114 is adapted to engage and traverse a network of rails 115 mounted to a surface 124, for example, rigidly mounted to a bed of a truck or plane, or the deck of a ship. In one aspect, the network of rails 115 may be removable from surface 124, for example, when not needed. The network of rails 115 may include, for example, at least one first set of rails 115A directed in a first direction, for example, in the direction of elongation of rails 115A, and at least one second set of rails 115B directed in a second direction, for example, different from the first direction, for instance, substantially perpendicular to the first direction. The rails 115A and 115B may be similar to and have all the attributes of rails 42 and 44 discussed herein. Transport and restraining device 114 may include a tow bar assembly 137 by which transport and restraining device 114 may be moved along the network of rails 115, for example, manually, by means of a vehicle, or, as will be discussed below, driven by one or more drive assemblies mounted on or to transport and restraining device 114.

Figure 7:
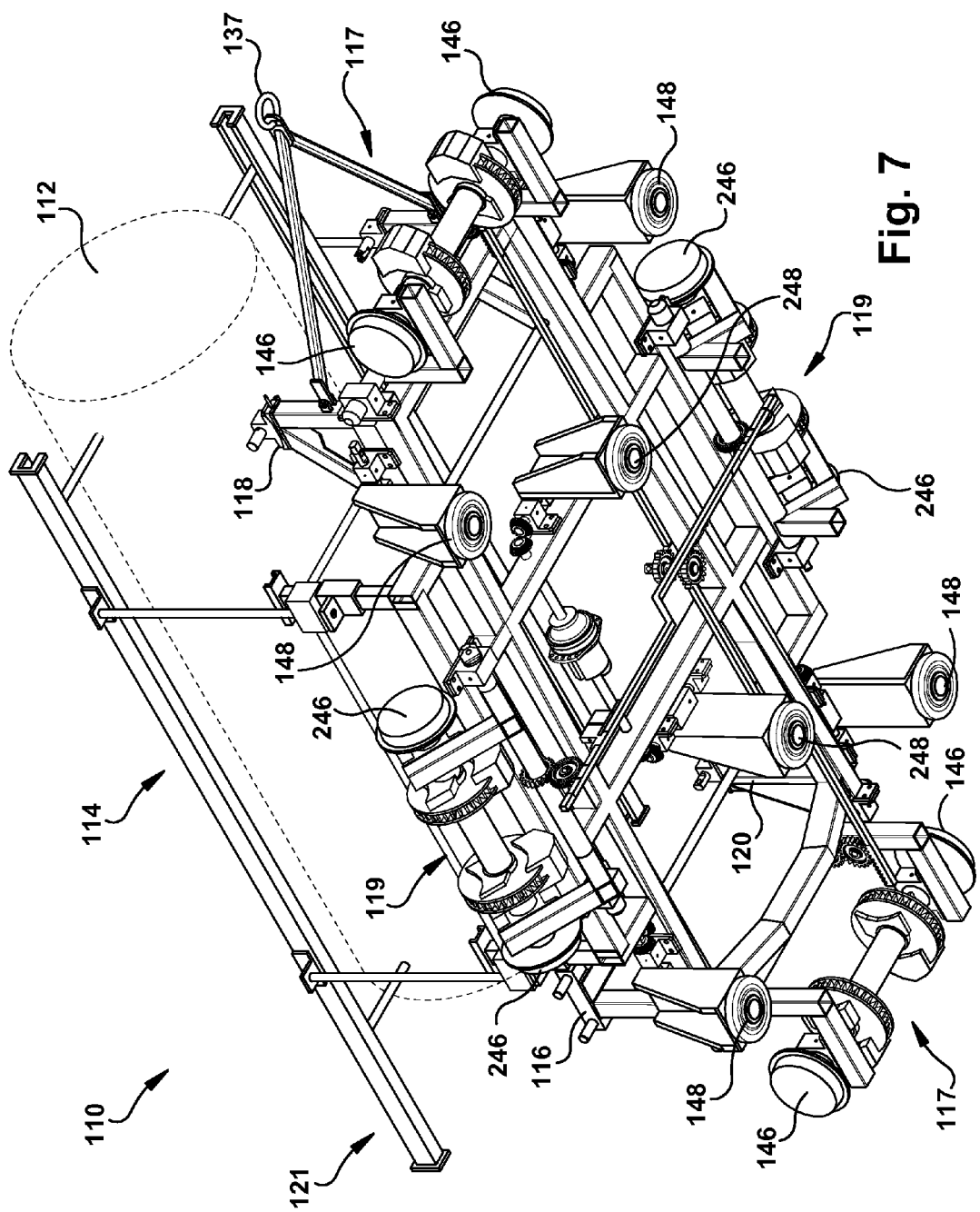
FIG. 7 is a bottom perspective view of the shown in FIG. 6, with the rails removed for clarity of illustration.

FIG. 7 is a bottom perspective view of the arrangement 110 shown in FIG. 6, with the network of rails 115 and surface 124 omitted to better illustrate aspects of the disclosure.

According to the embodiment shown in FIGS. 6 and 7, transport and restraining device 114 includes pivotally-mounted wheel assemblies 117 (for example, first wheel assemblies or axial translation wheel assemblies) adapted to engage and translate along and disengage from rails 115A; pivotally-mounted wheel assemblies 119 (for example, transverse translation wheel assemblies) adapted to engage and translate along and disengage rails 115B; and a load elevation adjustment mechanism 121. As shown in FIGS. 6 and 7 wheel assemblies 117 and wheel assemblies 119 may be pivotally mounted to support structure 116, and load elevation adjustment mechanism 121 may be mounted to support structure 116. In one aspect, transport and restraining device 114 may be adapted to translate load 112 in a horizontal direction as indicated by double arrow 123 (see FIG. 6), for example, forward and backward, as shown in FIG. 6; in a horizontal direction as indicated by double arrow 125, for example, left and right, as shown in FIG. 6; and/or a vertical direction as indicated by double arrow 127, for example, up and down, as shown in FIG. 6. In a fashion similar to earlier embodiments, support structure 116 is adapted to engage the network of rails 115 to minimize or prevent the movement of support structure 116 (and load 112) during adverse transport and/or storage conditions and/or during use.

Figure 8:
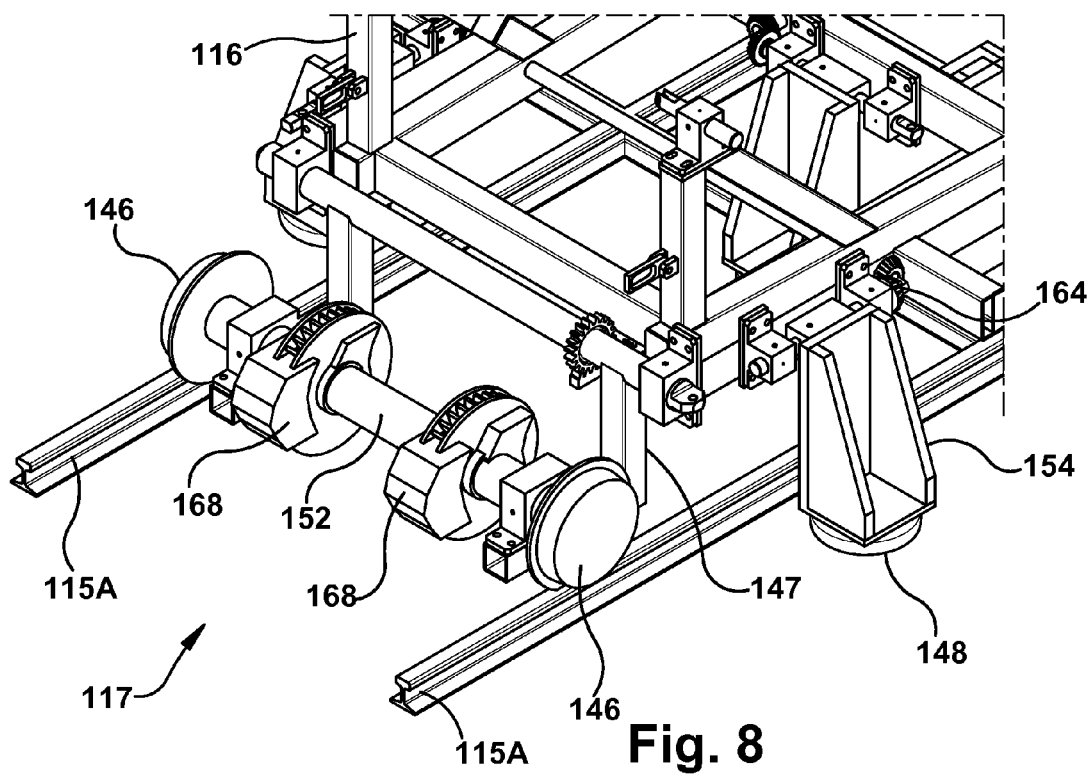
FIG. 8 is a detailed perspective view of one wheel assembly shown in FIGS. 6 and 7 according to one aspect of the disclosure.
Figure 9:
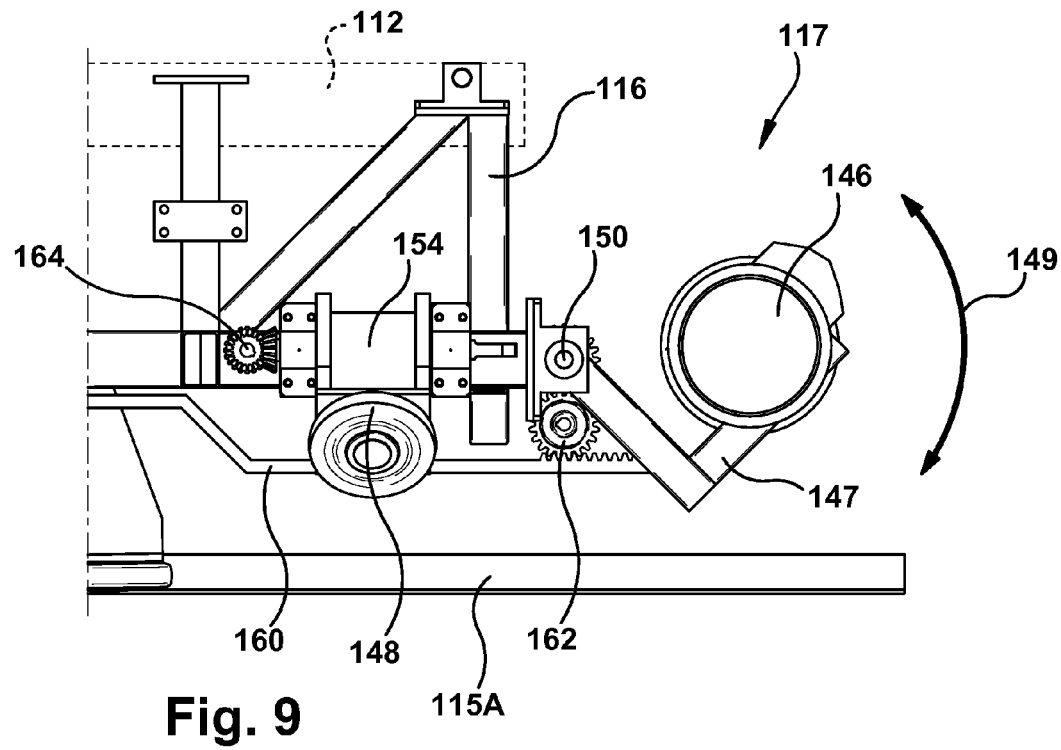
FIG. 9 is a detailed elevation view of the wheel assembly shown in FIG. 8.

FIG. 8 is a detailed perspective view of one wheel assembly 117 shown in FIGS. 6 and 7 according to one aspect of the disclosure. FIG. 9 is a detailed elevation view of wheel assembly 117 shown in FIG. 8. Aspects of the disclosure may include a least one wheel assembly 117. As shown in FIGS. 6 and 7, transport and restraining device 114 may typically include two wheel assemblies 117, which can be referred to as "axial translation wheel assemblies," positioned at opposite ends of transport and restraining device 114. However, it is envisioned that two or more wheel assemblies 117 may be provided, for example, having one or more assemblies 117 positioned at intermediate locations between the ends of transport and restraining device 114, for example, depending upon the length of transport and restraining device 114.

As shown in FIGS. 8 and 9, wheel assembly 117 is mounted to support structure 116, preferably, pivotally mounted, and is adapted to engage and disengage rails 115A. According to one aspect, wheel assembly 117 includes a set of wheels 146 (for example, a first plurality of wheels) mounted to wheel support arms 147 which are mounted to support structure 116, preferably, pivotally mounted to support structure 116. Wheels 146 may have all the attributes of wheels 46 disclosed above. For example, wheels 146 may be conical steel wheels having a rim. Wheels 146 may typically be mounted for rotation on axle 152 (FIG. 8) that is rotatably mounted to support arms 147. Axle 152 may be fixed or may rotate with wheels 146. In the aspect shown in FIGS. 8 and 9, axle 152 (FIG. 8) rotates with wheels 146. For example, axle 152 may be mounted to support arms 147 by means of anti-friction bearings (not shown), for example, ball, roller, or journal bearings, positioned in bearing housings (not shown) mounted to support arms 147.

Wheel support arms 147 may comprise any appropriate structure adapted to support axle 152 and engage support structure 116. For example, support arms 147 may comprise bars, beams, plates, or structural tubing. As shown in FIGS. 8 and 9, support arms 147 may comprise a pair of rectangular structural tubes formed into L-shaped structures defining a substantially 90 degree angle, or any other desired angle to allow for proper function, for example, by welding or mechanical fasteners. As shown most clearly in FIG. 9, according to a preferred aspect of the disclosure, support arms 147 are pivotally mounted to support structure 116 and can be rotated as indicated by double arrow 149. For example, according to aspects of the disclosure, support arms 147 may be rotated wherein wheels 146 engage and disengage rails 115A. In one aspect, support arms 147 may be pivotally mounted about pins 150 which mount to support structure 116 and about which support arms 147 rotate, for example, by means of a roller or journal bearing, or bushings.

As shown most clearly in FIG. 8, wheel assembly 117 may also include one or more brake assemblies 168 mounted to support structure 116 and engaging axle 152. Brake assemblies 168 may be similar in design and function to brake assemblies 68 disclosed above, for example, disk brake assemblies. Though not shown in FIG. 8 or 9, wheel assembly 117 may also include one or more drive assemblies, for example, the drive assembly may be any form of conventional source of rotational motive force, for example, any one of the drive assemblies 70 disclosed above. The drive assembly may drive axle 152 using a belt, a chain, or gears, among other drive train components.

As also shown in FIGS. 8 and 9, in a fashion similar to earlier embodiments disclosed herein, transport and restraining device 114 may be include a second set of wheels 148 mounted to support structure 116. According to this aspect, the second set of wheels 148 may be pivotally mounted to support structure 116 in a fashion similar or substantially identical to the mounting, operation, and function of wheels 48 disclosed herein. For example, wheels 148 may be mounted to wheel support structure 154 that is pivotally mounted to support structure 116 (for example, in a fashion similar to or substantially identical to the pivotal mounting of wheel support structure 54 disclosed herein). In addition, though not shown in FIGS. 8 and 9, transport and restraining device 114 may also include a third set of wheels (not shown) mounted to engage and/or disengage rail 115A in a fashion similar to or substantially identical to the mounting, operation, and function of wheels 50 disclosed herein. Wheels 146, the second set of wheels 148, and the third set of wheels (not shown, but similar to wheels 50) may have all the attributes of wheels 46, wheels 48, and wheels 50, respectively, disclosed herein. For example, wheels 148 and the third set of wheels may be metallic or non-metallic, for example, made of a rubber, whereby friction between the wheels and rails 115A is enhanced.

According to aspects of the disclosure, the rotation of wheel assembly 117 having wheels 146 and the rotation of wheel support structure 154 having wheels 148 may be practiced by any conventional means. For example, wheel assembly 117 and wheel support structure 154 may be rotated manually, for instance, by a technician; mechanically, for example, with gears, pneumatics, or hydraulics; and/or electronically, for example, via electronically driven actuators, and the like. For example, in one aspect, as shown in FIG. 9, wheel assembly 117 may be rotated mechanically by means of a toothed rack 160 and a toothed pinion 162, where pinion 162 is mechanically coupled to support arms 147. Also, as shown in FIGS. 8 and 9, wheel support structure 154 may be rotated mechanically by means of a as set of gears 164, for example, beveled bears, mechanically coupled to support structure 154. Though not shown in FIGS. 8 and 9 rack 160 and gears 164 may be actuated by any conventional means, including, manually, mechanically (including hydraulically or pneumatically), and/or electrically.

According to aspects of the disclosure, contact of at least one of the first plurality of wheels 146 with the top of rail 115A (for example, a first rail) and contact of at least one of the second plurality of wheels 148 with one of the sides (for example, a first side) of rail 115A substantially prevents disengagement of the support structure 116 (and hence the load 112) from the set of rails 115A (which are secured to surface 124, see FIG. 6). Though, in one aspect, at least one of the first plurality of wheels 146 may contact rail 115A and at least one of second plurality of wheels 148 may contact rail 115A, in other aspects, typically, two or more wheels 146 and 148 may contact rails 115A. For example, as shown in FIGS. 6 and 7, exactly four (4) wheels 146 and exactly four (4) wheels 148 may preferably contact both rails 115A to secure support structure 116 (and its load 112) to rails 115A.

Figure 10:
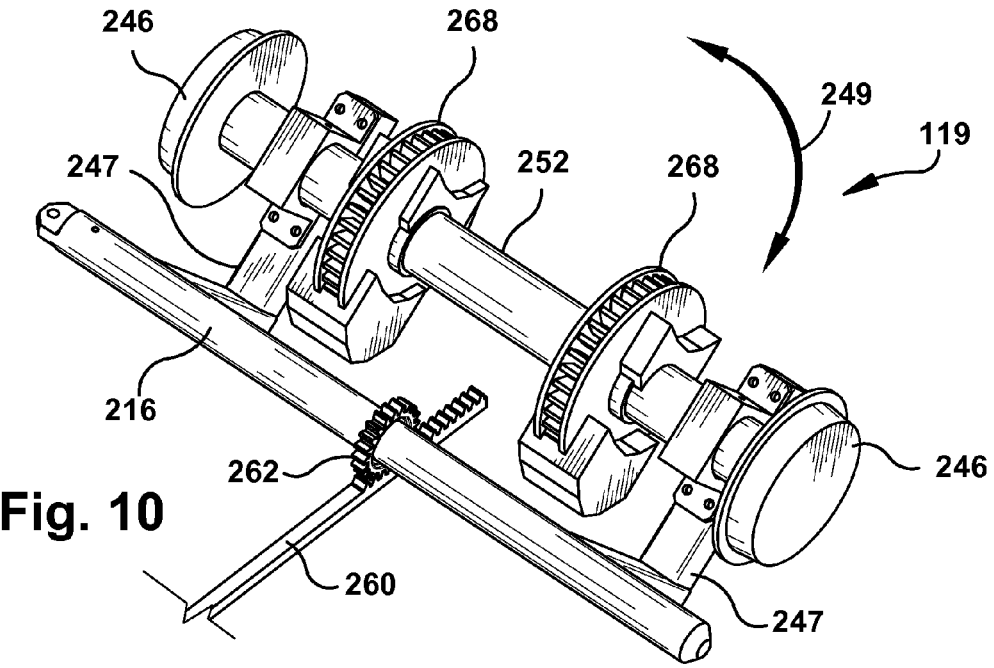
FIG. 10 is a detailed perspective view of another wheel assembly shown in FIGS. 6 and 7 according to another aspect of the disclosure.
Figure 11:
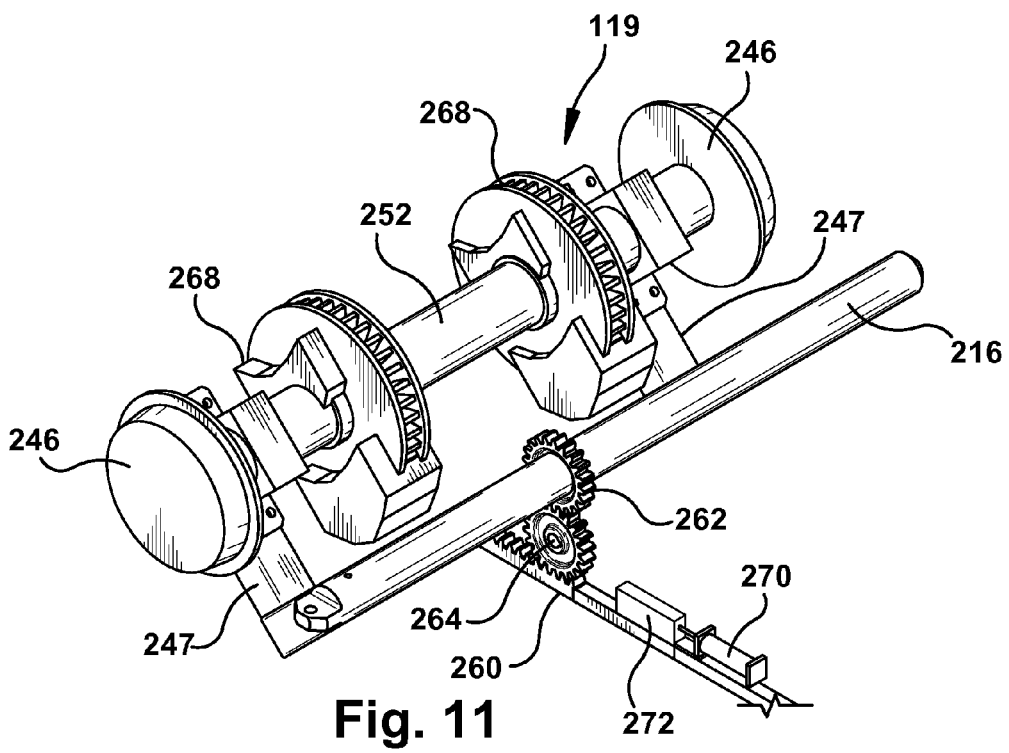
FIG. 11 is another detailed perspective view of the wheel assembly shown in FIG. 10.

FIG. 10 is a detailed perspective view of one wheel assembly 119 shown in FIGS. 6 and 7 according to one aspect of the disclosure. FIG. 11 is another detailed perspective view of wheel assembly 119 shown in FIG. 10. Aspects of the disclosure may include a least one wheel assembly 119. As shown in FIGS. 6 and 7, transport and restraining device 114 may typically include two wheel assemblies 119, which can be referred to as "transverse translation wheel assemblies," positioned at opposite sides of transport and restraining device 114. However, it is envisioned that two or more wheel assemblies 119 may be provided, for example, having one or more assemblies 119 positioned at intermediate locations between the sides of transport and restraining device 114, for example, depending upon the width of transport and restraining device 114.

As shown in FIGS. 10 and 11, wheel assembly 119 is mounted to frame 116 (not shown), preferably, pivotally mounted, and is adapted to engage and disengage rails 115B (not shown in FIGS. 10 and 11). According to one aspect, wheel assembly 119 includes a set of wheels 246 mounted to wheel support arms 247 which are mounted to support structure 116, preferably, pivotally mounted to support structure 116. For example, support arms 247 may typically be mounted to rotatable shaft 216 that is rotatably mounted to support structure 116, for example, by appropriate conventional bearings, such as, journal or roller bearings, or bushings. Wheels 246 may have all the attributes of wheels 46 disclosed above. For example, wheels 246 may be conical steel wheels having a rim. Wheels 246 may typically be mounted for rotation on axle 252, which is rotatably mounted to support arms 247. Axle 252 may be fixed or may rotate with wheels 246. In the aspect shown in FIGS. 10 and 11, axle 252 rotates with wheels 246. For example, axle 252 may be mounted to support arms 247 by means of anti-friction bearings (not shown), for example, ball, roller, or journal bearings, positioned in bearing housings (not shown) mounted to support arms 247.

Wheel support arms 247 may comprise any appropriate structure adapted to support axle 252 and engage support structure 116. For example, support arms 247 may comprise bars, beams, plates, or structural tubing. As shown in FIGS. 10 and 11, support arms 247 may comprise a pair of rectangular structural tubes formed into L-shaped structures defining a substantially 90 degree angle, or any other desired angle to allow for proper function, for example, by welding or mechanical fasteners. According to a preferred aspect of the disclosure, support arms 247 are mounted to shaft 216 and shaft 216 is pivotally mounted to support structure 116 (FIGS. 6-7) whereby wheel assembly 119 can be rotated about the axis of shaft 216 as indicated by double arrow 249. For example, according to aspects of the disclosure, support arms 247 may be rotated wherein wheels 246 engage and disengage rails 115B (not shown in FIGS. 10 and 11, see FIG. 6).

As shown most clearly in FIGS. 10 and 11, wheel assembly 119 may also include one or more brake assemblies 268 mounted to support structure 116 and engaging axle 252. Brake assemblies 268 may be similar in design and function to brake assemblies 68 disclosed above, for example, disk brake assemblies. Though not shown in FIGS. 10 and 11, wheel assembly 119 may also include one or more drive assemblies, for example, the drive assembly may be any form of conventional source of rotational motive force, for example, any one of the drive assemblies 70 disclosed above. The drive assembly may drive axle 252 using a belt, a chain, or gears, among other drive train components.

As shown in FIGS. 6 and 7, in a fashion similar to earlier embodiments disclosed herein, transport and restraining device 114 may include a second set of wheels 248 pivotally mounted to support structure 116 in a fashion similar or substantially identical to the mounting, operation, and function of wheels 48 disclosed herein. For example, wheels 248 may be mounted to a wheel support structure that is pivotally mounted to support structure 116 (for example, in a fashion similar to or substantially identical to the pivotal mounting of wheel support structure 54 disclosed herein). In addition, though not shown in FIGS. 6 and 7, transport and restraining device 114 may also include a third set of wheels (not shown) mounted to engage and/or disengage rail 115B in a fashion similar to or substantially identical to the mounting, operation, and function of wheels 50 disclosed herein. Wheels 248 and the third set of wheels (similar to wheels 50) may have all the attributes of wheels 48 and 50, respectively, disclosed herein. For example, wheels 248 and the third set of wheels may be metallic or non-metallic, for example, made of a rubber, whereby friction between the wheels and rails 115B is enhanced.

Returning to FIGS. 10 and 11, according to aspects of the disclosure, the rotation of wheel assembly 119 having wheels 246 and the rotation of wheel support structure having wheels 248 (see FIGS. 6 and 7) may be practiced by any conventional means. For example, wheel assembly 119 and the wheel support structure of wheel 248 may be rotated manually, for instance, by a technician; mechanically, for example, with gears, pneumatics, or hydraulics; and/or electronically, for example, via electronically-driven actuators, and the like. For example, in one aspect, as shown in FIGS. 10 and 11, wheel assembly 119 may be rotated mechanically by means of a toothed rack 260 and a toothed pinion 262, where pinion 262 is mounted so rotatable shaft 216. As shown in FIG. 11, rack 260 may engage an idler gear or pinion 264 to reverse the rotation of shaft 216, as appropriate. According to aspects of the disclosure, rack 260 and gears 262 and 264 may be actuated by any conventional means, including, manually, mechanically, and/or electrically. For example, as shown in FIG. 11, a cylinder 270, such as, a hydraulic or a pneumatic cylinder, may be used to engage and deflect a pusher block 272 mounted to rack 260 to rotate pinions 264 and 262, shaft 216, and wheel assembly 119.

According to aspects of the disclosure, contact of at least one of the wheels 246 (for example, a first wheel) with the top of rail 115B (for example, a first rail) and contact of at least one of the second plurality of wheels 248 with one of the sides (for example, a first side) of rail 115B substantially prevents disengagement of the support structure 116 (and hence the load 112) from the set of rails 115B (which are secured to surface 124, see FIG. 6). Though, in one aspect, at least one of the first plurality of wheels 246 may contact rail 115B and at least one of second plurality of wheels 248 may contact rail 115B, in other aspects, typically, two or more wheels 246 and 248 may contact rails 115B. For example, as shown in FIGS. 6 and 7, exactly four (4) wheels 246 and exactly two (2) wheels 248 may preferably contact both rails 115B to secure support structure 116 (and its load 112) to rails 115B.

One typical mode of operating arrangement 10 and transport and restraining device 114 may be illustrated and described with respect to FIGS. 6 and 7. In an initial configuration, load 112 may be loaded on transport and restraining device 114, both wheel assemblies 117 may be rotated into engagement with rails 115A, four wheels 148 may be engaged with rails 115A, both wheel assemblies 119 may be rotated out of engagement with (or disengaged from) rails 115B, and two wheels 248 (see FIG. 7) may be rotated out of engagement with (or disengaged from) rails 115B. Accordingly, in this initial configuration, transport and restraining device 114 may be retained on rails 115A by wheels 146 and wheels 148. In one aspect, load 112 may be mounted to load elevation adjustment mechanism 121 (discussed below). In one aspect, with the engagement of wheels 146 and wheels 148, transport and restraining device 114 with load 112 may be translated on rails 115A as indicated by double arrow 123. This translation of transport and restraining device 114 may be practiced manually, for example, pushed and/or pulled by one or more technicians, or with the aid of drive assemblies (not shown) and/or brake assemblies 168 (see FIG. 8). Before, during, or after the translation of transport and restraining device 114 along rails 115A, wheels 148 may be rotated out of engagement with rails 115A, as necessary, to avoid contacting rails 115B.

According to one aspect, transport and restraining device 114 may be transferred from rails 115A to rails 115B and translated along rails 115B. First, in this aspect, transport and restraining device 114 may be positioned along rails 115A wherein wheels 246 of wheel assemblies 119 align over rails 115B. With the alignment of wheels 246 over rails 115B, wheels 246 of wheel assemblies 119 may be rotated into engagement with rails 115B, for example, manually or automatedly, such as, with cylinder 270 (see FIG. 11). With the engagement of wheels 246 with rails 115B, wheels 246 on rails 115B may support transport and restraining device 114 with load 112, and wheels 146 of wheel assemblies 117 may be disengaged from rails 115A. Also, wheels 148 may be disengaged from rails 115A, if not already rotated out of engagement with rails 115A.

With the disengagement of wheels 146 and 148, and the support of transport and restraining device 114 by wheels 246 on rails 115B, transport and restraining device 114 with load 112 may be translated on rails 115B as indicated by double arrow 125. Again, this translation of transport and restraining device 114 along rails 115B may be practiced manually, for example, pushed and/or pulled by one or more technicians, or with the aid of drive assemblies (not shown) and/or brake assemblies 168 (see FIG. 8). Before, during, or after the translation of transport and restraining device 114 along rails 115B, wheels 248 (see FIG. 7) may be rotated out of engagement with rails 115B, as necessary, to avoid contacting rails 115A during translation along rails 115B.

After translation along rails 115B, transport and restraining device 114 may be translated along the second set of rails 115A by first positioning transport and restraining device 114 along rails 115B wherein wheels 146 of wheel assemblies 117 align over rails 115A. With the alignment of wheels 146 over rails 115A, wheels 146 of wheel assemblies 117 may be rotated into engagement with rails 115A, for example, manfully or automatedly, such as, with cylinder 270 (see FIG. 11). With the engagement of wheels 146 with rails 115A, transport and restraining device 114 with load 112 may be supported on wheels 146, and wheels 246 of wheel assemblies 119 may be disengaged from rails 115B. Also, wheels 148 may be disengaged from rails 115A, if not already rotated out of engagement with rails 115A, to avoid contacting rails 115B during translation along rails 115A. Also, in one aspect, wheels 148 may be re-engaged with rails 115A, for instance, once wheels 148 have passed rails 115B and contact has already been avoided, for example, to continue to stabilize and restrain transport and restraining device 114, for example, during adverse environmental conditions.

Other sequences of engaging and disengaging wheels 146, 148, 246 and/or 248 with rails 115A and 115B, before, during, and/or after translating transport and restraining device 114 along rails 115A and 115B will be apparent to those of skill in the art and are encompassed by aspects of the present disclosure.

Figure 12:
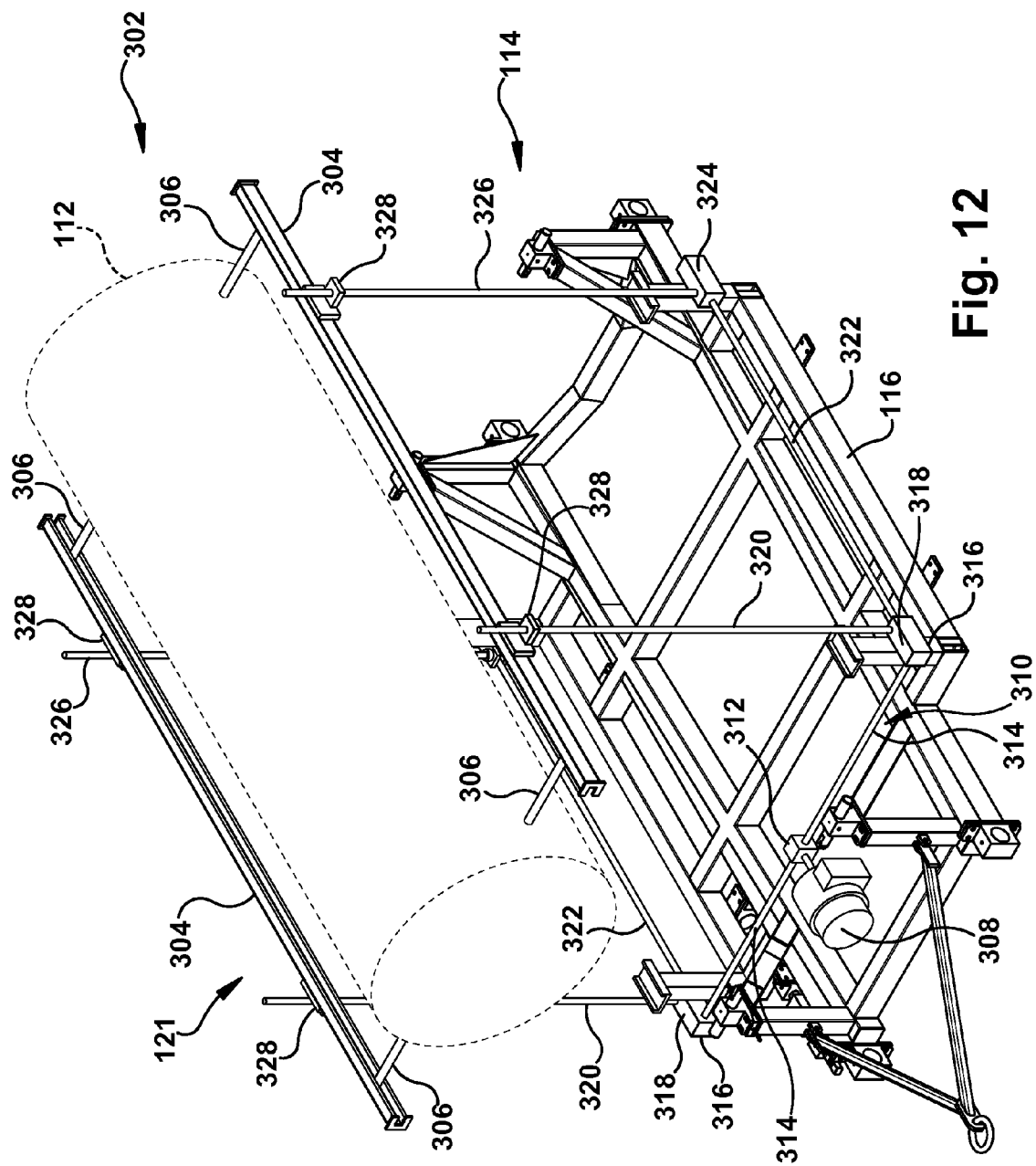
FIG. 12 is a perspective view of the load elevation adjustment mechanism shown in FIGS. 6 and 7 according to one aspect of the disclosure.

FIG. 12 is a perspective view of the load elevation adjustment mechanism 121 shown in FIGS. 6 and 7 according to one aspect of the disclosure. As shown in FIG. 12, elevation adjustment mechanism 121 may be mounted to support structure 116 of transport and restraining device 114 carrying load 112. Assorted assemblies that may be associated with transport and restraining device 114, such as, wheel assemblies 117 and 119, are omitted from FIG. 12 to facilitate illustration of aspects of the disclosure.

According to aspects of the disclosure, load elevation adjustment mechanism 121 includes a cradle or support frame 302 adapted to receive load 112, for example, an industrial machine or heavy machinery, such as, a turbine, as disclosed herein. Cradle 302 may take a wide variety of structural shapes or forms, for example, depending upon the size and shape of load 112. However, as shown in one aspect in FIG. 12, cradle 302 may include a set of elongated structural members 304, for example, beams, trusses, rods, bars, or the like, and a plurality of cross members or struts 306 extending from the structural members 304 to load 112. For example, according to one aspect, load 112 may include support collars (not shown) adapted to engage cross members 306, though cross members 306 may engage load 112 directly. Though not shown in FIG. 12, in one aspect, cross members 306 may extend between elongated members 304 wherein load 112 may rest on and be supported by cross members 306. In the aspect shown in FIG. 12, two elongated members 304 are shown; however, it is envisioned that two (2) or more elongated members 304 may be provided depending upon the size, length, or weight of load 112. In the aspect shown in FIG. 12, four cross members 306 are shown; however, it is envisioned that two (2) or more cross members 306 may be provided depending upon the size, length, or weight of load 112.

According to aspects of the disclosure, cradle 302 may be raised and lowered as needed to vary the elevation of cradle 302 (and load 112), as needed, for example, for transport, installation, maintenance, and/or servicing. The raising and lowering of cradle 302 with respect to support structure 116 may be practiced by any conventional means, for example, mechanically, including with a mechanical drive train, pneumatically, and/or hydraulically; electronically, including with motors and sensors; and/or manually, by one or technician, or any combination thereof. In the aspect of the disclosure shown in FIG. 12, cradle 302 of load elevation adjustment mechanism 121 is raised and lowered electromechanically, that is, with the use of one or more electric or hydraulic motors 308 and mechanical drive train 310 mounted on support structure 116.

In one aspect, as shown in FIG. 12, drive train 310 includes a gear box 312 coupled to an output shaft of motor 308, and gear box 312 rotates opposing shafts 314 coupled to gear boxes 316. Each gear boxes 316 drives a gear box 318 that drives both a vertical shaft 320 and a horizontal shaft 322. Each horizontal shaft 322 then drives gear boxes 324 (only one of two gear boxes 324 is shown in FIG. 12), which drive vertical shafts 326. According this aspect of the disclosure, vertical shafts 320 and 326 engage cradle 302 to raise and lower cradle 302. For example, in the aspect shown in FIG. 12, elongated members 304 of cradle 302 are provided with plates 328, each plate 328 having a linear actuator adapted to translate plates 328 (and cradle 302) up and down with the rotation of shafts 320 and 326. For example, in one aspect, at least the ends of shafts 320 and 326 engaging plates 328 may be appropriately threaded, and engage the linear actuator, for example, a ball-screw nut, mounted to each plate 328. Accordingly, upon rotation of shafts 320 and 326, cradle 304 may be raised and lowered, to raise or lower load 112, as needed. Though the drive train 310 shown in FIG. 12 includes four vertical shafts 320 and 326, and their associated drive train components, it is envisioned that two (2) or more or six (6) or more vertical shafts 320 and 326 may be used depending, among other things, upon the dimensions and weight of load 112. Other mechanism for raising and lowering cradle 302 will be apparent to those of skill in the art, and are believed to be within the scopes of aspects of the disclosure.

Figure 13:
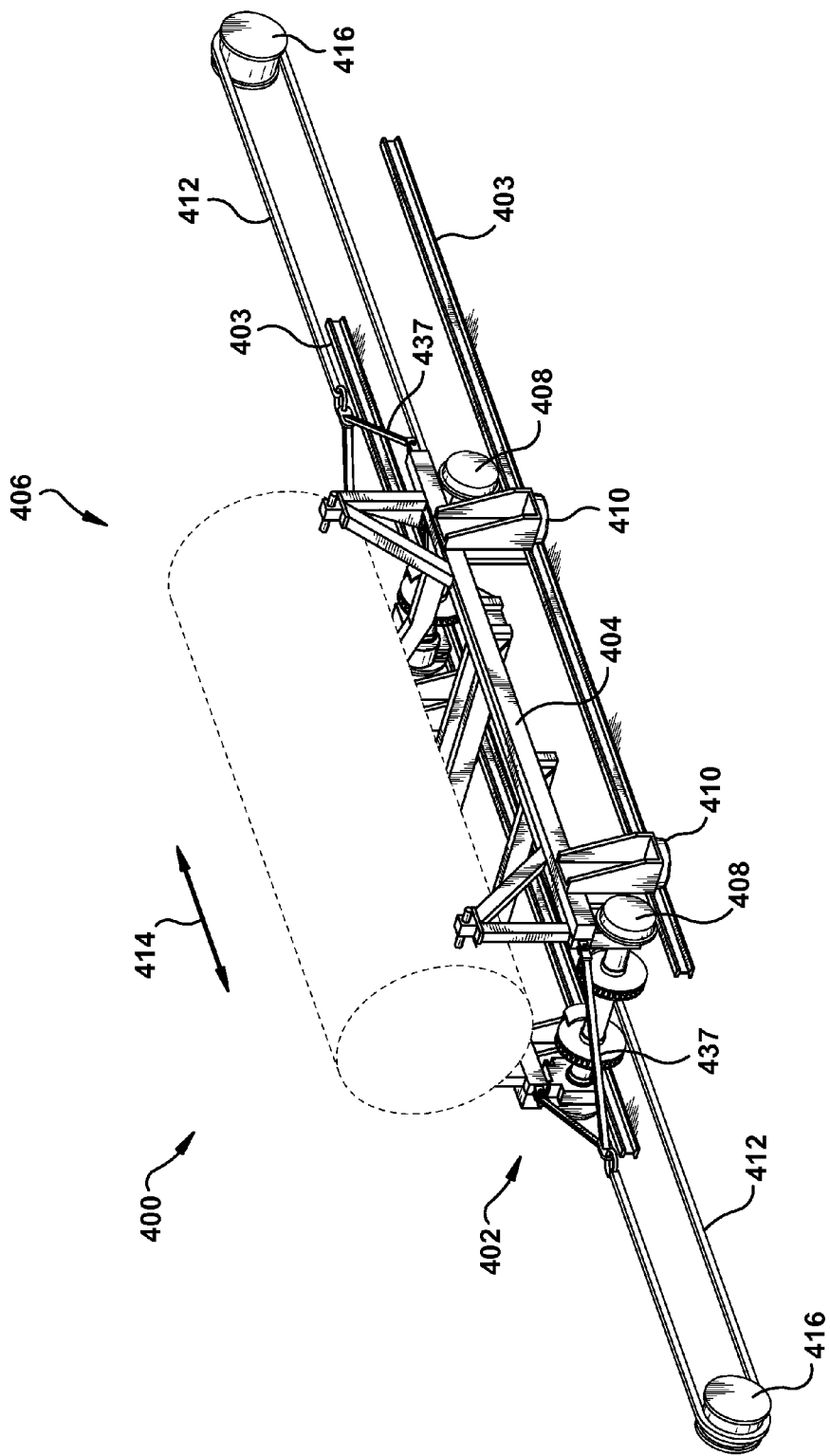
FIG. 13 is a perspective view of one arrangement for translating a load mounted on a transport and restraining device according to one embodiment of the disclosure.

FIG. 13 is a perspective view of one arrangement 400 for translating a transport and restraining device 402 according to one embodiment of the disclosure. As shown in FIG. 13, transport and restraining device 402, which may be substantially the same as transport and restraining device 34 or transport and restraining device 114 disclosed herein, includes a support structure 404 adapted to retain a load 406. Transport and restraining device 402 is mounted on a set of rails 403, for example, rails similar to rails 42, 44, 115A, or 115B, as disclosed herein. Load 406 may be any industrial machine or heavy machinery as disclosed herein, for example, a gas turbine and the like. Support structure 404 includes wheels 408, for example, wheels substantially the same as wheels 46 or 146 disclosed herein, for example, mounted on wheel assembly 117 as disclosed herein. Support structure 404 may also includes wheels 410, for example, wheels substantially the same as wheels 48 or 148 disclosed herein, for example, mounted on rotatable wheel support structure 54 or 154, respectively, as disclosed herein. As also shown in FIG. 13, support structure 404 also includes a two (2) tow bar assemblies 437, for example, similar to tow bar assembly 37 or 137 disclosed herein.

According to an aspect of the disclosure, the arrangement 400 shown in FIG. 13 includes an elongated tensile member 412, for example, a chain, a belt, a band, a sling, a rope, a cord, or the like. Tensile member 412 may be metallic; for example, a metallic link chain or a metallic cord, or non-metallic, for example, tensile member 412 may comprise an elastomeric band or belt. According to aspects of the disclosure, tensile member 412 is attached to transport and restraining device 402, for example, mounted to opposing tow bar assemblies 437, and is used as a means for pulling transport and restraining device 402 (and its load 406) along rails 403, for example, in the directions indicted by double arrow 414. Member 412 may be mounted to tow bar assemblies 437 by conventional means, for example, with conventional hardware, such as, with clasps, rings, hooks, pins, nuts, bolts, devises, couplings, and grommets, and the like. In one aspect, transport and restraining device 402 may be moved "axially" that is in the axial direction of transport and restraining device 402, as shown by double arrow 414 in FIG. 13; in another aspect, transport and restraining device 402 may be moved "transversally" using elongated member 412, for example, in a direction substantially perpendicular to double arrow 414, for instance, when rails 403 are oriented in a direction substantially perpendicular to rails 403, or any orientation between these extremes.

According to one aspect of the disclosure, the motive force or tension in member 412 may be provided manually, for example, by one or more technicians. However, as shown in FIG. 13, in another aspect, an automated driver 416, for example may provide the motive force applied to member 412, a drum, pulley, or sheave powered by a motive device, for example, a motor (not shown). The motor powering driver 416 may be an electric motor or a hydraulic motor. For example, in one aspect, driver 416 may be the drum of a hydraulic winch.

According to one aspect of the disclosure, a single drive 416 may be provided to translate transport and restraining device 402 along rails 403. However, as shown in FIG. 13, in another aspect, two or more drivers 416 may be provided, for example, two opposing drivers 416 shown in FIG. 13. According to one aspect, tensile member 412 may be an individual, separate tensile member, for example, a separate band, belt, or chain mounted to be driven by drivers 416 and operatively connected to transport and restraining device 402. In the aspect shown in FIG. 13, tensile member 412 may comprise a continuous, one-piece member having one end mounted to one tow bar assembly 437 and the other, opposite end, mounted to the other, opposite, tow bar assembly 437.

As shown and describe with respect to FIG. 13, according to an aspect of the disclosure, arrangement 400 may be used to move or translate transport and restraining device 402 (with or without load 406) along rails 403 by rolling on wheels 408. In one aspect, the movement or translation of transport and restraining device 402 may be practiced with or without the engagement of wheels 410 with rails 403. For example, during adverse environmental conditions, the translation of transport and restraining device 402 along rails 403 may be practiced while wheels 410 are engaged with rails 403, for instance, to stabilize and restrain transport and restraining device 402 on rails 403. However, in other aspects, for example, without adverse environmental conditions, transport and restraining device 402 may be moved while wheels 410 are not engaged with rails 403. Though not shown in FIG. 13, it is envisioned that elongated tensile member 412 with or without drivers 416 may be used to translate transport and restraining device 402 in a transverse direction, for example, substantially perpendicular to the direction of double arrow 414 when, for instance, transport and restraining device 402 includes transverse translation wheel assemblies 119 (see FIGS. 6 and 7) which engage rails 115B.

Figure 14:
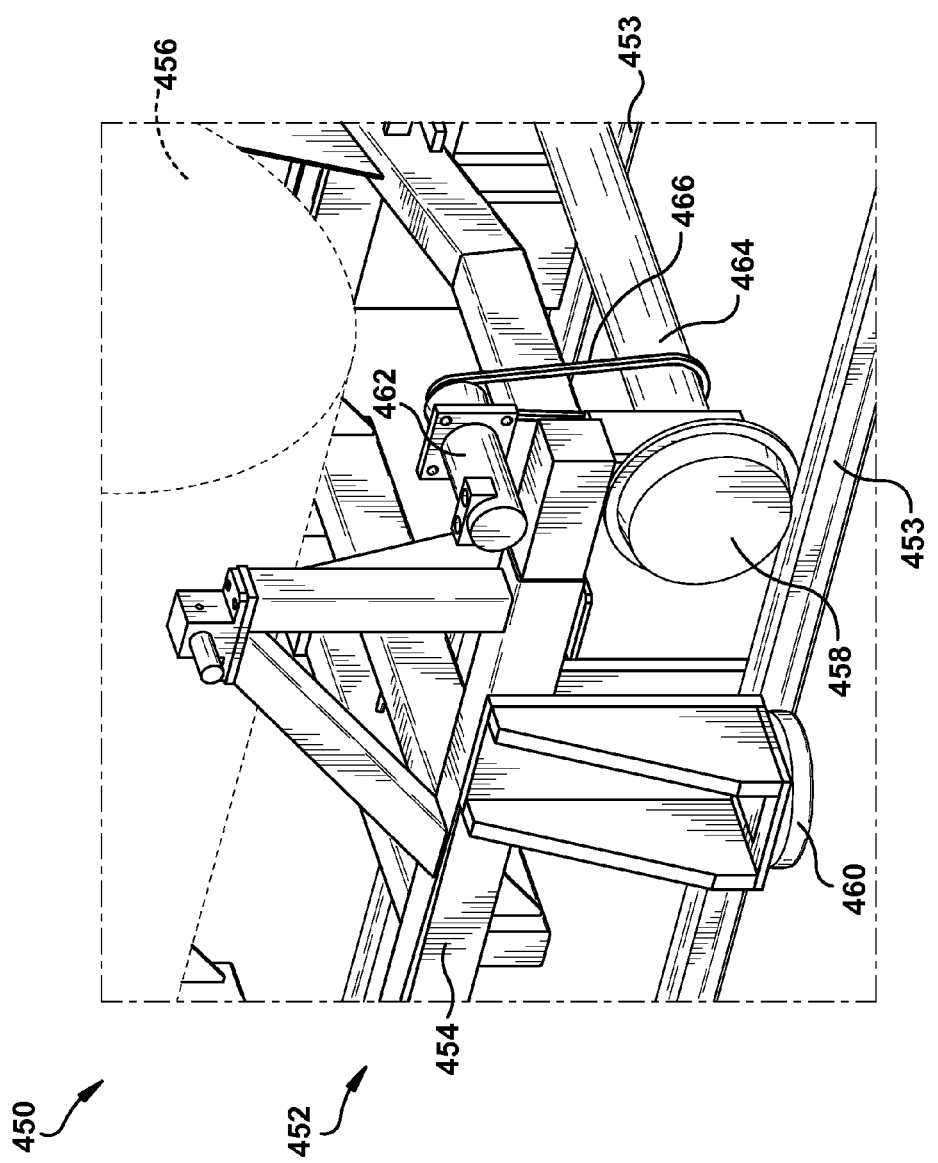
FIG. 14 is a perspective view of another arrangement for translating a load mounted on a transport and restraining device according to another aspect of the disclosure.

FIG. 14 is a perspective view of another arrangement 450 for translating a transport and restraining device 452 according to another aspect of the disclosure. As shown in FIG. 14, transport and restraining device 452, which may be substantially the same as transport and restraining device 34 or transport and restraining device 114 disclosed herein, includes a support structure 454 adapted to retain a load 456. Transport and restraining device 452 is mounted on a set of rails 453, for example, rails similar to rails 42, 44, 115A, or 115B, as disclosed herein. Load 456 may be any industrial machine or heavy machinery as disclosed herein, for example, a gas turbine and the like. Support structure 454 includes wheels 458, for example, wheels substantially the same as wheels 46 or 146 disclosed herein, for example, mounted on wheel assembly 117 as disclosed herein. Support structure 454 may also includes wheels 460, for example, wheels substantially the same as wheels 48 or 148 disclosed herein, for example, mounted on rotatable wheel support structure 54 or 154, respectively, as disclosed herein.

As also shown in FIG. 14, according to this aspect of the disclosure, support structure 454 also includes one or more motive drivers 462, for example, an electric or hydraulic motor, adapted to drive wheels 458. For example, as shown in FIG. 14, driver 462 may be coupled to an axle 464 upon which wheels 458 are mounted. The coupling of driver 462 to axle 464 may be accomplished by conventional means, for example, by means of a belt or chain 466 mounted to a gear, sheave, or pulley on driver 462 and engaged with a gear, sheave, or pulley (not shown) mounted on axle 464. Other mechanisms for driving wheels 458 will be apparent to those of skill in the art.

Though not shown in FIGS. 13 and 14, the transport and restraining device 402 and 452 may also include one or more brake assemblies and drive assemblies as disclosed herein, for example, one or more brake assemblies 68 and/or drive assemblies 70 disclosed and described with respect to FIGS. 4 and 8-12.

The arrangements 400 and 450 for translating transport and restraining device 402 and 452 shown in FIGS. 13 and 14 may be operated manually or automatedly. For example, in one aspect, the operation of drivers 416 and/or driver 462 may be practiced manually, for example, by a technician. However, in another aspect, the operation of drivers 416 and/or driver 462 may be practiced automatedly, for example, controlled by electrical or mechanical actuators, for instance, stepper motors, hydraulic motors, and the like, operated under the control of one or more automated controllers, for example, a computer or a programmable logic controller (PLC). The controllers (not shown) for drivers 416 and/or driver 462 may be located on or adjacent to transport and restraining device 402 and 452 (for example, contained in a hand-held device or a user interface mounted to transport and restraining device 402 or 452) that interfaces wirelessly or via wire to actuators mounted on transport and restraining device 402 or 452, for example, on or about support structure 404 or 454, respectively. In another aspect, the controllers adapted to operate drivers 416 and/or driver 462 may be remotely located, for example, in an adjacent room or a distant location, which interfaces (for example, via a network and/or the internet) wirelessly or via wire to actuators mounted on transport and restraining device 402 and 452.

It will be apparent from the foregoing that the disclosure, in its many aspects, provides devices, systems, and methods for securing loads, such as, turbines or other equipment, to surfaces, for example, to the decks of ships or beds of trucks. The load may comprise any conceivable structure, device, or machine. The industrial machines for which aspect of the disclosure may be employed include, but are not limited to, generators and turbomachinery (for example, turbines, compressors, and pumps), engines, motors, vehicles, trucks, machine tools, construction equipment, storage containers, jet engines, steam engines, wind turbines, robots, power stations, oil tanks, and any or all so-called state-of-the-art heavy machines, and the like. The features of the aspects of the transport and restraining devices disclosed herein allow the transport and securing of equipment, such as, gas turbines, manually and/or under the control of automated devices. Where prior art systems and methods may not prevent the movement or toppling of structures during undesirable transport environments, aspects of the present disclosure can provide secure and robust restraint of loads regardless of the transportation conditions encountered.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises," "comprising," "including," and/or "having" when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical applications, and to enable others of ordinary skill in the art to understand the disclosure for various embodiments with various modifications as are suited to the particular use contemplated.

This written description uses examples to disclose the disclosure, including the best mode envisioned, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A load transport and restraining device comprising:
a support structure adapted to receive a load;
a first plurality of wheels mounted to the support structure, at least one of the first plurality of wheels positioned to contact a top of a first rail of a set of rails;
a first adjustable support mounting the first plurality of wheels to the support structure, the first adjustable support being configured to selectively engage and disengage the first plurality of wheels with the top of the first rail;
a second plurality of wheels mounted to the support structure, at least one of the second plurality of wheels positioned to contact a first side of the first rail of the set of rails;
a second adjustable support mounting the second plurality of wheels to the support structure, the second adjustable support being configured to selectively engage and disengage the second plurality of wheels with the side of the first rail, wherein the second adjustable support is independently adjustable with respect to the first adjustable support;
wherein contact of the least one of the first plurality of wheels with the top of the first rail and contact of the least one of the second plurality of wheels with the first side of the first rail substantially prevents disengagement of the support structure from the set of rails.

2. The transport and restraining device as recited in claim 1, further comprising a third plurality of wheels mounted to the support structure, at least one of the third plurality of wheels is positioned to contact a second side, opposite the first side, of the first rail.

3. The transport and restraining device as recited in claim 2, wherein the device further comprises an adjustable support for the at least one of the third plurality of wheels mounted to the support structure.

4. The transport and restraining device as recited in claim 3, wherein the adjustable support for the at least one of the third plurality of wheels is rotatably mounted to the support structure.

5. The transport and restraining device as recited in claim 4, wherein the rotatably-mounted, adjustable support for the at least one of the third plurality of wheels is adapted to engage and disengage the at least one of the third plurality of wheels with the first rail.

6. The transport and restraining device as recited in claim 1, wherein the first adjustable support is rotatably mounted to the support structure.

7. The transport and restraining device as recited in claim 1, wherein the set of rails is mounted on a surface, and wherein each of the first plurality of wheels comprises an axis of rotation directed substantially parallel to a plane of the surface.

8. The transport and restraining device as recited in claim 1, wherein the set of rails is mounted on a surface, and wherein each of the second plurality of wheels comprises an axis of rotation directed substantially perpendicular to a plane of the surface.

9. The transport and restraining device as recited in claim 1, wherein the first plurality of wheels is rotatably mounted to the support structure.

10. The transport and restraining device as recited in claim 1, wherein the device further comprises at least one transverse translation wheel assembly mounted to the support structure.

11. The transport and restraining device as recited in claim 1, wherein the device further comprises a load elevation adjustment mechanism.

12. The transport and restraining device as recited in claim 1, wherein the device further comprises at least one of a brake assembly adapted to regulate rotation of at least one of the first plurality of wheels and at least one drive assembly adapted to rotate at least one of the first plurality of wheels.

13. The transport and restraining device as recited in claim 1, wherein the load comprises a turbine.

14. A method of restraining a load, the method comprising:
   a) mounting a transport and restraining device comprising a support structure, a first plurality of wheels mounted to the support structure, a second plurality of wheels mounted to the support structure, and a third plurality of wheels mounted to the support structure, to a set of rails mounted on a surface, wherein the first plurality of wheels selectively engages or disengages a top of a first rail of the set of rails, and the second plurality of wheels selectively engages or disengages a first side of the first rail of the set of rails;
   b) prior to or after a), mounting a load to the transport and restraining device;
   c) adjusting a first support to engage at least one of the first plurality of wheels with the top of the first rail;
   d) adjusting a second support to engage at least one of the second plurality of wheels with the first side of the first rail; and
   e) engaging at least one of the third plurality of wheels with a set of transverse rails;
   wherein the contact of the at least one of the first plurality of wheels with the top of the first rail and contacting at least one of the second plurality of wheels with the first side of the first rail at least partially restrains the load to the set of rails and the surface, and wherein the second adjustable support is independently adjustable with respect to the first adjustable support.

15. The method as recited in claim 14, wherein the transport and restraining device further comprises a rotatably mounted support structure for the at least one of the second plurality of wheels mounted to the support structure, and wherein contacting the at least one of the second plurality of wheels with the first side of the first rail comprise rotating the rotatably mounted support structure wherein the at least one of the second plurality of wheels contacts the first side of the first rail.

16. The method as recited in claim 14, wherein the method further comprises, prior to a) and b), d) transporting the load by rolling of the first plurality of wheels along the set of rails.

17. The method as recited in claim 16, wherein the transport and restraining device further comprises a brake assembly and a drive assembly each operatively connected to at least one of the first plurality of wheels, and wherein d) transporting the load by rolling of the first plurality of wheels along the set of rails comprises activating at least one of the brake assembly and the drive assembly.

18. A load transport and restraining device comprising:
   a support structure adapted to receive a load;
   a first plurality of wheels mounted to the support structure, at least one of the first plurality of wheels positioned to contact a top of a first rail of a set of rails;
   a second plurality of wheels mounted to the support structure, at least one of the second plurality of wheels positioned to contact a first side of the first rail of the set of rails; and
   at least one transverse translation wheel assembly mounted to the support structure;
   wherein contact of the least one of the first plurality of wheels with the top of the first rail and contact of the least one of the second plurality of wheels with the first side of the first rail substantially prevents disengagement of the support structure from the set of rails.

* * * * *